United States Patent
Yamaguchi et al.

(10) Patent No.: US 9,025,457 B2
(45) Date of Patent: May 5, 2015

(54) ROUTER AND CHIP CIRCUIT

(71) Applicant: Panasonic Corporation, Osaka (JP)

(72) Inventors: Takao Yamaguchi, Osaka (JP); Atsushi Yoshida, Osaka (JP); Tomoki Ishii, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 45 days.

(21) Appl. No.: 13/645,655

(22) Filed: Oct. 5, 2012

(65) Prior Publication Data

US 2013/0028090 A1 Jan. 31, 2013

Related U.S. Application Data

(63) Continuation of application No. PCT/JP2011/002356, filed on Apr. 22, 2011.

(30) Foreign Application Priority Data

May 12, 2010 (JP) ................................. 2010-110478

(51) Int. Cl.
*G06F 1/32* (2006.01)

(52) U.S. Cl.
CPC ............ *G06F 1/3206* (2013.01); *G06F 1/3237* (2013.01); *G06F 1/3287* (2013.01); *G06F 1/324* (2013.01); *G06F 1/3275* (2013.01); *Y02B 60/1225* (2013.01)

(58) Field of Classification Search
CPC .............. H04L 12/12; H04L 12/40039; H04L 41/0833; H04L 47/266; Y02B 60/34; Y02B 60/35; Y02B 60/43; Y02B 60/44; Y02B 60/1225; G06F 1/3206; G06F 1/3237; G06F 1/3287; G06F 1/324; G06F 1/3275

USPC .................................. 370/235, 236, 254, 255
See application file for complete search history.

(56) References Cited

U.S. PATENT DOCUMENTS

2004/0184483 A1* 9/2004 Okamura et al. ............. 370/477
2007/0253410 A1 11/2007 Dielissen
(Continued)

FOREIGN PATENT DOCUMENTS

| JP | 2007-528177 T | 10/2007 |
|----|---------------|---------|
| JP | 2010-161501 A | 7/2010 |
| WO | 2009/150849 A1 | 12/2009 |

OTHER PUBLICATIONS

Machine Translation of WO2009/150849.*
(Continued)

*Primary Examiner* — Paul H Masur
(74) *Attorney, Agent, or Firm* — Renner, Otto, Boisselle & Sklar, LLP.

(57) ABSTRACT

Routers in a data transfer system relay data between the first node and each of the second nodes. A router includes a load value processing section and an aggregation decision section. The load value processing section obtains information about a load value of another router connected to a communications bus. The load value is a time delay caused by that another router and/or the throughput of that router. The aggregation decision section chooses one of the second nodes at which the data is to be received, and determines a transmission path between the second node chosen and the first node in accordance with information about the load value obtained from each router and information determined during a design process about the number of stages of routers from the first node through each second node and/or the length of data to be transferred.

10 Claims, 16 Drawing Sheets

(56) References Cited

U.S. PATENT DOCUMENTS

| | | | | |
|---|---|---|---|---|
| 2009/0252054 | A1* | 10/2009 | Barkan et al. | 370/252 |
| 2010/0002589 | A1* | 1/2010 | Ciordas et al. | 370/241 |
| 2010/0020718 | A1* | 1/2010 | Tabbara et al. | 370/254 |
| 2011/0060831 | A1 | 3/2011 | Ishii et al. | |
| 2012/0075995 | A1* | 3/2012 | Welin et al. | 370/235 |
| 2012/0082057 | A1* | 4/2012 | Welin et al. | 370/252 |

OTHER PUBLICATIONS

Machine Translation of Arai et al., "Proposal on ECO-friendly Distributed Routing Protocol for Reducing Network Energy Consumption", IEICE Technical Report, vol. 109, No. 411, Jan. 28, 2010, pp. 17 to 22.*

International Search Report for corresponding International Application No. PCT/JP2011/002356 mailed Jun. 7, 2011.

International Preliminary Report on Patentability for corresponding International Application No. PCT/JP2011/002356 dated Feb. 14, 2012.

Arai et al., "Proposal on ECO-friendly Distributed Routing Protocol for Reducing Network Energy Consumption", IEICE Technical Report, vol. 109, No. 411, Jan. 28, 2010, pp. 17 to 22.

John Kim; "Low-Cost Router Microarchitecture for On-Chip Networks", MICRO'09, ACM, Dec. 12, 2009.

Matsutani et al., "Evaluations of Run-Time Power-Gating of On-Chip Routers for CMP", Information Processing Society of Japan Research Report 2009-ARC-185, No. 2, Oct. 2009.

Chinese Search Report dated Dec. 31, 2014 for corresponding Chinese application No. 201180021329.0 and English translation thereof.

Arai et el., "Eco-friendly Distributed Routing Protocol for Reducing Network Energy Consumption", IEICE Technical Report, Jan. 28, 2010, pp. 104-111.

* cited by examiner

R: ROUTER

R: ROUTER

FIG.9
TRAFFIC FLOW PROPERTY

| FLOW ID | DATA TYPE | SHORT DELAY TRANSFER REQUEST | AMPLITUDE |
|---------|-----------|------------------------------|-----------|
| A | CONTROL DATA | 1 ↑ HIGH | ±5% |
| B | AUDIO DATA | 2 | ±10% |
| C | VIDEO DATA | 3 | ±30% |
| ⋮ | ⋮ | ⋮ | ⋮ |

(A)

(B)

R0: TURNED OFF

| IDENTIFICATION NUMBER | SOURCE ADDRESS | DESTINATION ADDRESS |
|---|---|---|
| 1 | A | B |
| 2 | C | D |
| 3 | C | D |

| IDENTIFICATION NUMBER | TRANSMITTING SECTION TO USE |
|---|---|
| 1 | M1 |
| 2 | MY |
| 3 | M3 |

| ROUTE | NUMBER OF STAGES OF ROUTERS (H) | DATA LENGTH (L) | TIME DELAY (D) | NUMBER OF FLOWS | ESTIMATED VALUE | |
|---|---|---|---|---|---|---|
| ROUTE 1 | 2 | 2 | 1 | 10 | 4 | (1) |
| ROUTE 2 | 4 | 2 | 1 | 60 | 8 | |
| ROUTE 3 | 2 | 2 | 1 | 20 | 4 | (2) |
| ROUTE 4 | 2 | 4 | 1 | 80 | 8 | |
| ROUTE 5 | 2 | 2 | 2 | 100 | 8 | (3) |
| ROUTE 6 | 2 | 2 | 4 | 50 | 16 | |

ROUTER AND CHIP CIRCUIT

This is a continuation of International Application No. PCT/JP2011/002356, with an international filing date of Apr. 22, 2011 which claims priority of Japanese Patent Application No. 2010-110478, filed on May 12, 2010, the contents of which are hereby incorporated by reference.

BACKGROUND

1. Technical Field

The present application relates to a network transfer technology for transferring data while saving the power, and cutting down the latency, as much as possible in a semiconductor system that can distribute loads such memory accesses.

2. Description of the Related Art

In order to distribute memory access loads over a semiconductor chip circuit, a semiconductor system circuit with a hierarchical memory architecture, in which a number of memories with multiple different access rates are organically coupled together with their implementation costs and processing performances taken into account, has been proposed. Among other things, to overcome the problem of overloads on a bus, researches and developments have been carried on to distribute the traffic among multiple transmission paths evenly using a so-called "Network on Chip" (which will be abbreviated herein as "NoC" and) which is a network in a semiconductor chip circuit.

As an NoC needs a number of memories and will dissipate a lot of power, it is important to cut down the power dissipation by relays (also called "routers") in the NoC. Thus, a power gating technique, by which the routers selectively stop or resume their operation depending on whether or not they need to relay the traffic, has been proposed for that purpose.

"Evaluations of Run-Time Power-Gating of On-Chip Routers for CMP" (Hiroki Matsutani, Michihiro Koibuchi, Hiroshi Nakamura, and Hideharu Amano, Information Processing Society of Japan Research Report 2009-ARC-185, No. 2, October 2009 (herein referred to as "Non-Patent Document No. 1") proposes a method for mitigating the startup time by routing because it often raises a problem when the routers need to resume their operation. Meanwhile, a technique for stopping or resuming the routers' operation on a fine grain unit basis has also been laid open to general public.

SUMMARY

If a control section for specific operation were provided specially for the router, the design cost and part cost would increase to get the complicated control done.

One non-limiting, and exemplary embodiment provides a technique to overcome such a problem with the related art without providing such a special-purpose control section.

In one general aspect, a router as an embodiment of the present disclosure for use in a data transfer system that includes a first node from which data is transmitted, a plurality of second nodes at any of which the data that has been transmitted from the first node is receivable, and a plurality of routers that relay the data to be transferred between the first node and each of the second nodes. The router includes: a load value processing section configured to obtain information about a load value of another router that is connected to a communications bus, the load value being a time delay caused by that another router and/or the throughput of that router; and an aggregation decision section configured to choose, in a situation where multiple traffic flows have been generated, one of the second nodes at which the data is to be received, and configured to determine a transmission path between the second node chosen and the first node in accordance with information about the load value obtained from each said router and information determined during a design process about the number of stages of routers from the first node through each said second node and/or the length of data to be transferred.

In a situation where multiple traffic flows have been generated at the same time, the router of the present disclosure aggregates transmission paths to transfer those traffic flows through and/or memories to store data on those traffic flows in accordance with information about the processing time delay obtained from each router and according to the quality of transfer required for each traffic flow. Consequently, the network on chip NoC can save the power dissipated while reducing the latency caused by power gating even without providing any special control section for mitigating the delay for the router.

BRIEF DESCRIPTION OF DRAWINGS

FIG. 9 shows exemplary properties of traffic flows that run through an NoC.

Figure 11:
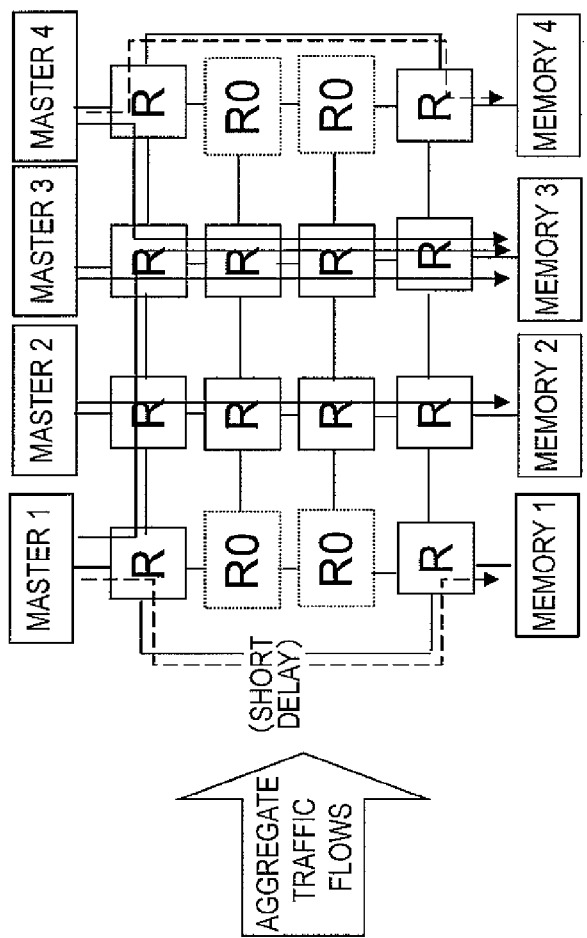
Figure 11:
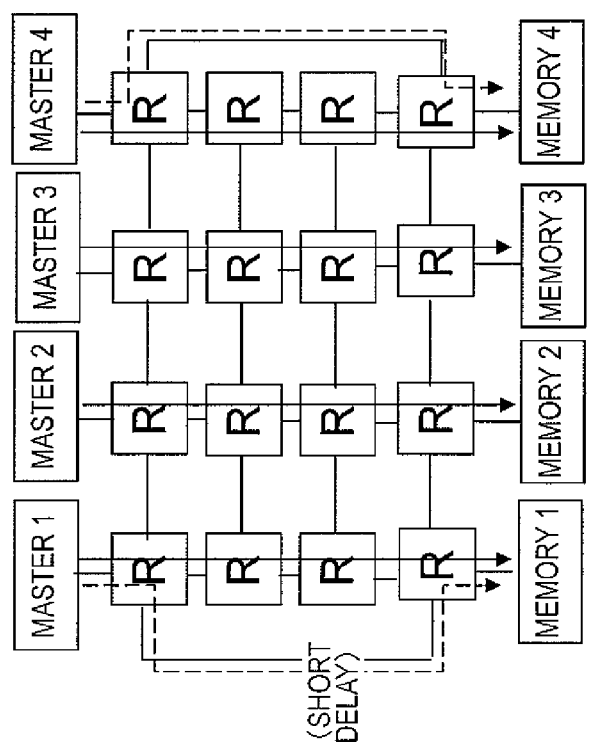

(A) and (B) of FIG. 11 illustrate an example in which traffic flows are aggregated and the routers are selectively operated based on an estimation equation.

Figure 12:
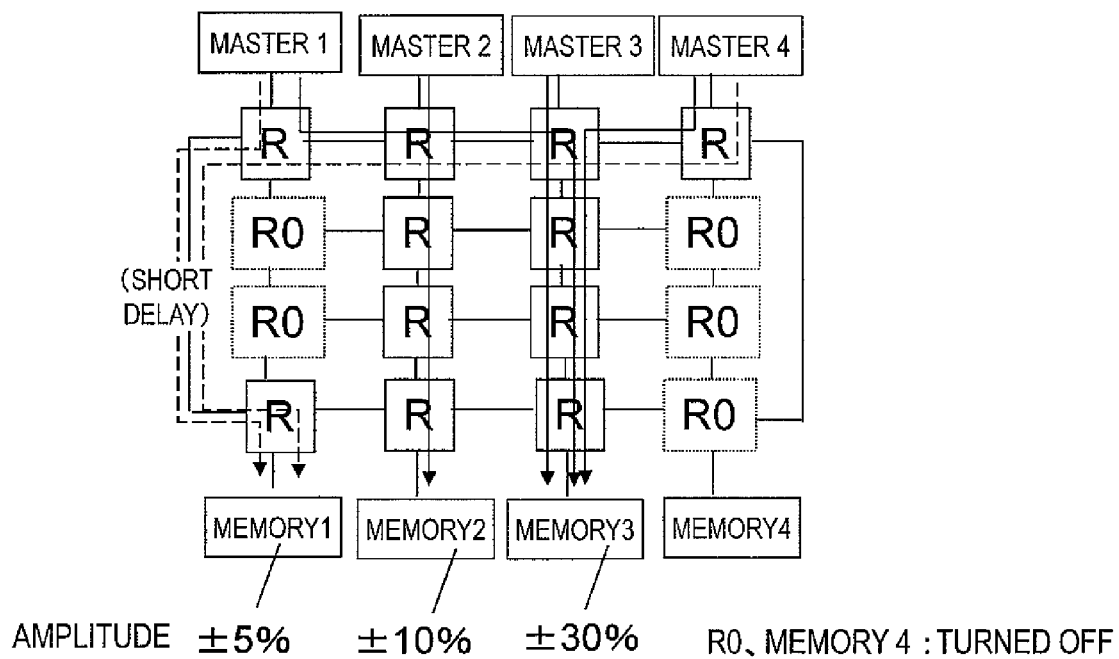

FIG. 12 shows an example of memories and transmission paths to use that have been determined according to the properties of the traffic flows.

Figure 13:
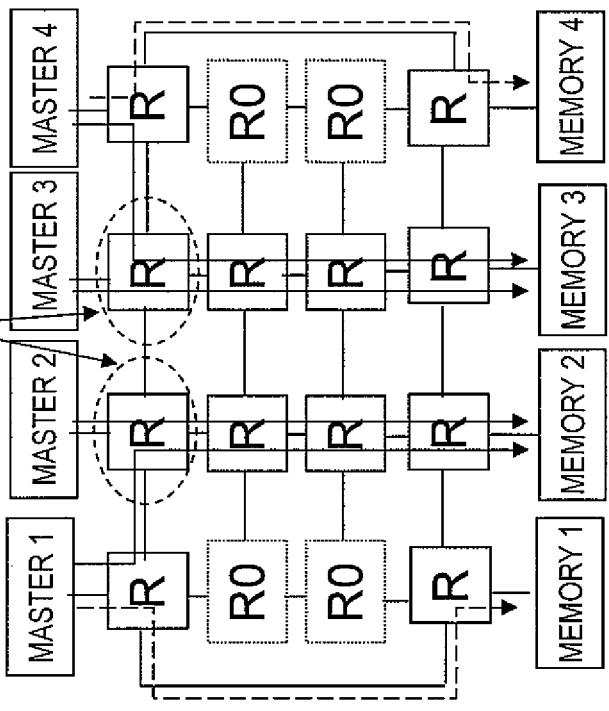
Figure 13:
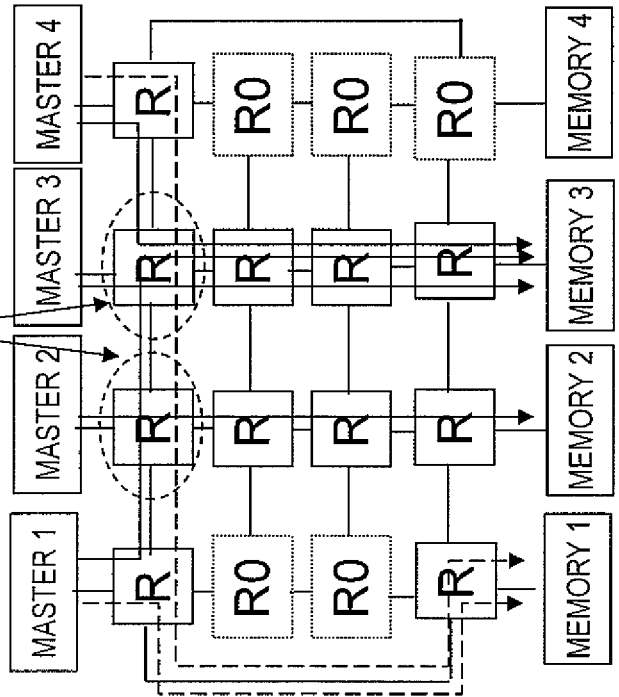

(A) and (B) of FIG. 13 illustrate how traffic flows are changed before and after the number of times of crossing between the traffic flows has been reduced at the routers.

Figures 14A, 14B, 14C:
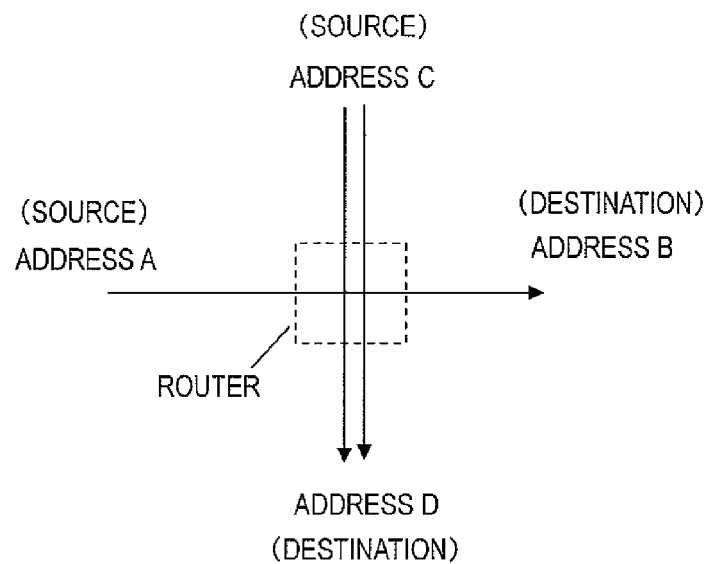

FIG. 14A shows three traffic flows that cross each other, and 14B and 14C show the crossing information tables managed by the flow crossing decision section 213.

Figure 15:
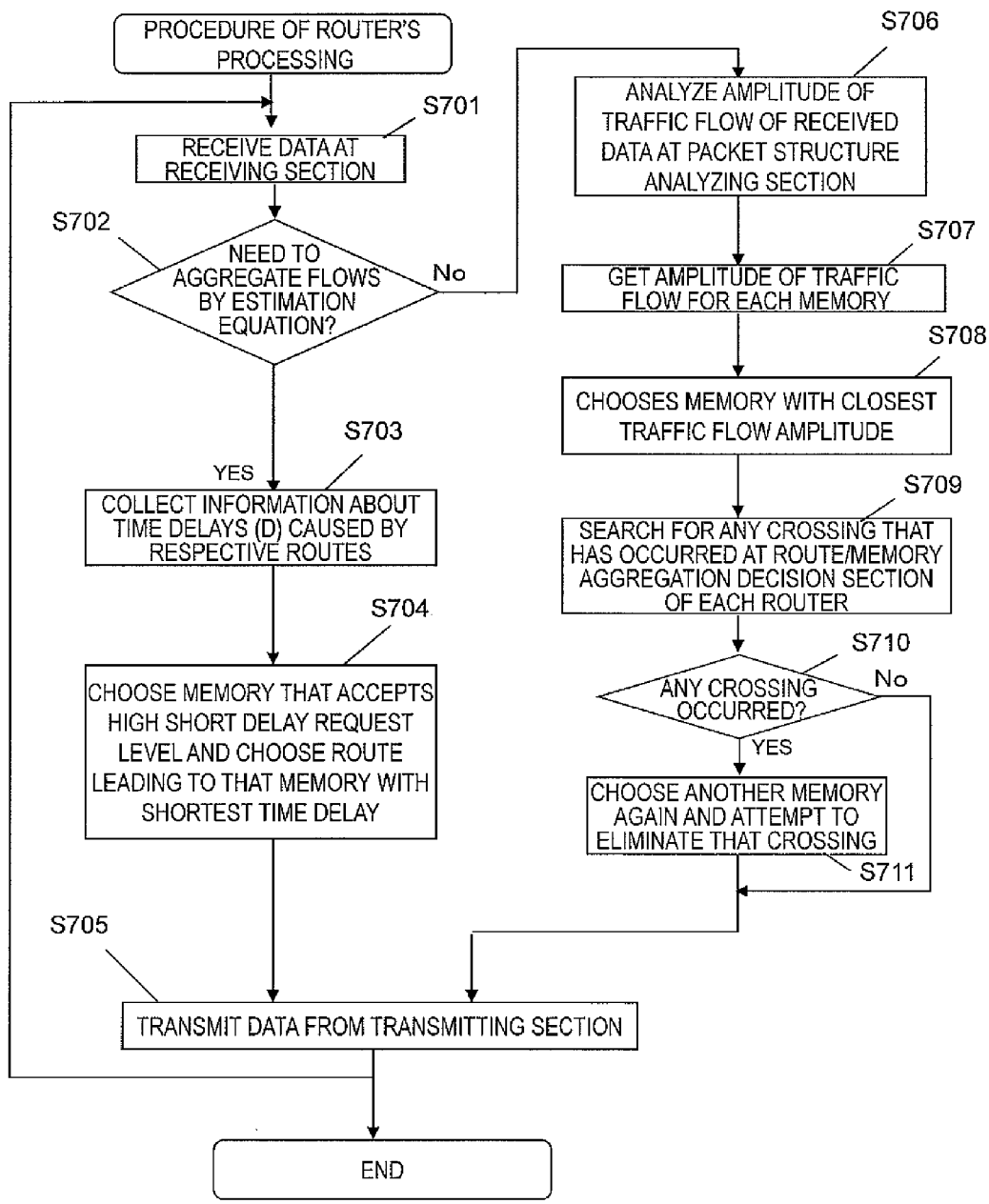

FIG. 15 is a flowchart showing the procedure of processing to get done by a router.

Figures 16, 17:
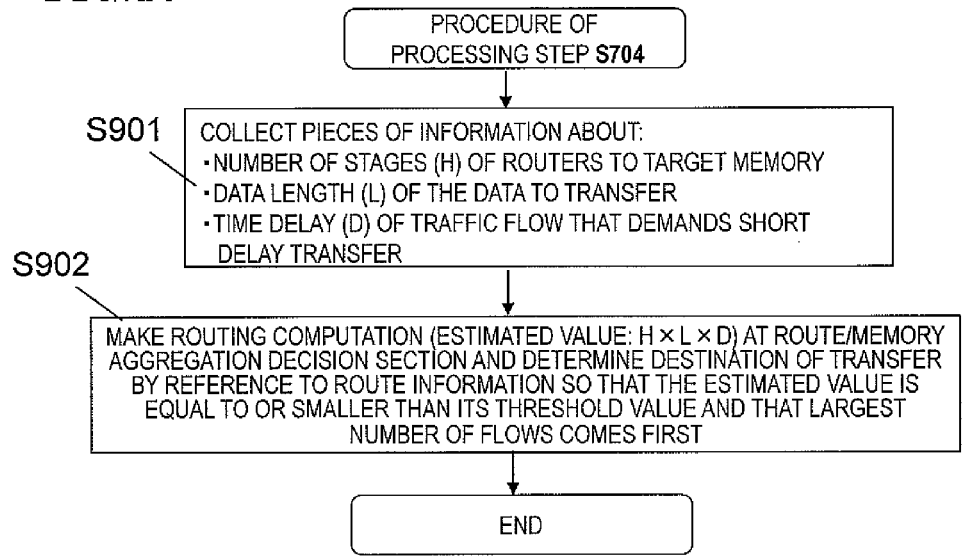

FIG. 16 is a flowchart showing a detailed procedure of the processing step S704 shown in FIG. 15.

FIG. 17 shows specific examples of estimated values on which a memory and a route are selected.

Figure 18:
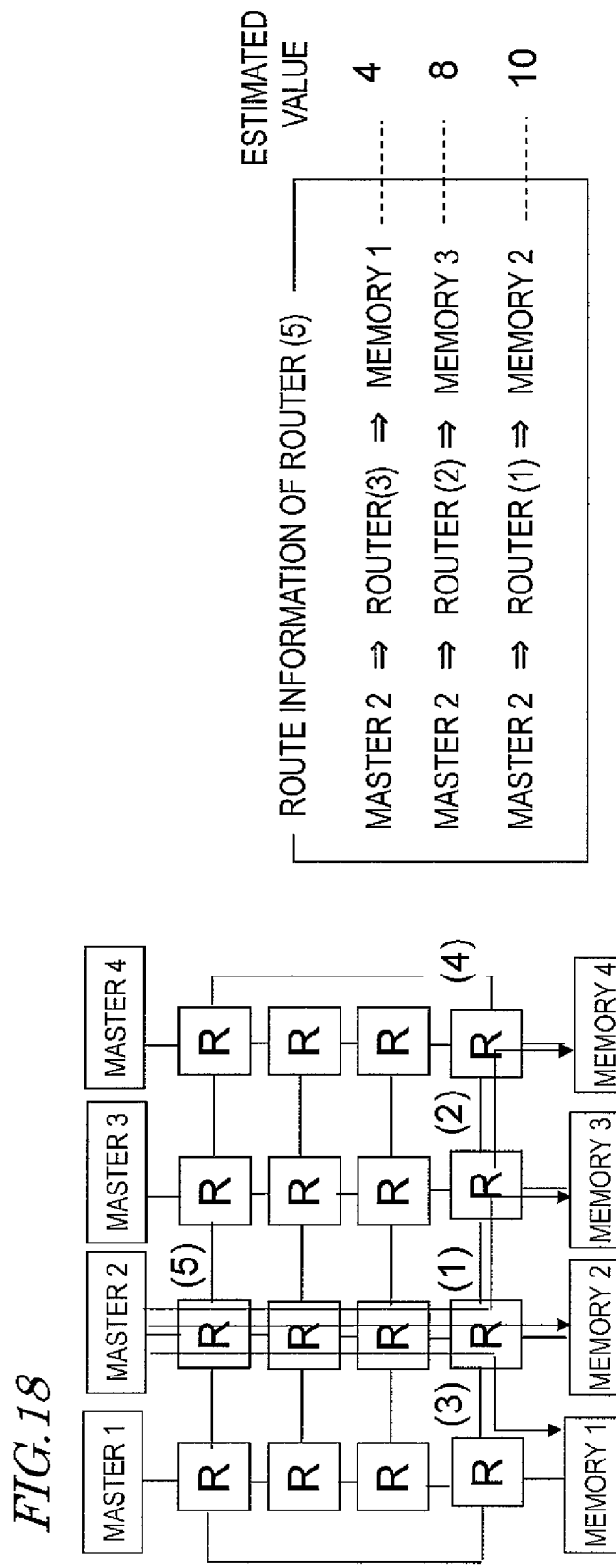

FIG. 18 shows a specific example in which a memory and a route are selected based on an estimated value.

Figure 19B:
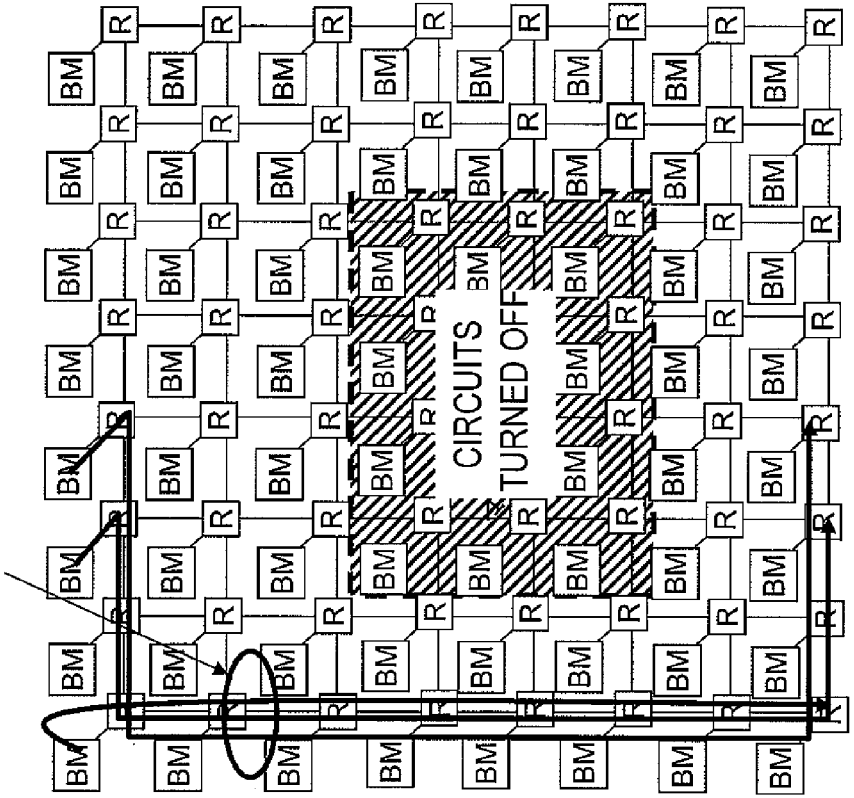
Figure 19A:
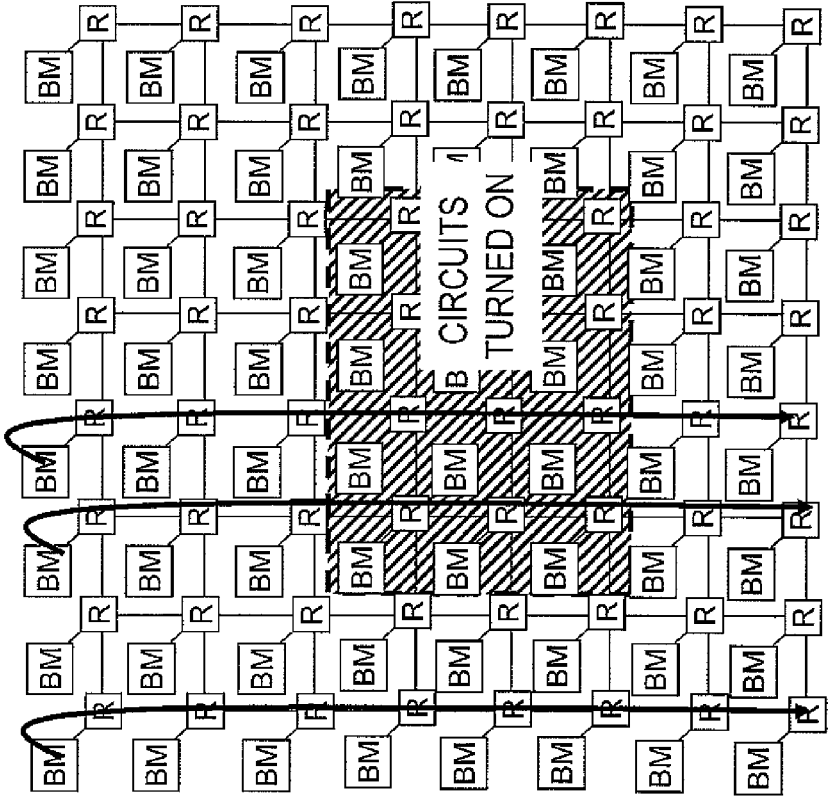

FIGS. 19A and 19B illustrate an example in which the circuits that form bus masters and routers are turned OFF on a functional block basis.

DETAILED DESCRIPTION

Before specific embodiments of the present disclosure are described, first of all, the problem of the conventional router will be described.

As memory accesses will change incessantly on an NoC, there is a growing demand for distributing memory access loads in order to meet memory access requests. And to realize that, not only memories to store data but also transmission paths from a bus master (such as a CPU or a DSP) to the memories need to be determined.

If memories and transmission paths are determined so that the traffic can be distributed evenly among those memories and transmission paths, the loads on the memories and transmission paths can be lightened. In addition, by distributing the loads on the memories and transmission paths, the peak value of the loads can be lowered. As a result, the maximum performance required for the transmission paths can be set to be relatively low during the design process, and the power can also be saved by adopting transmission paths that operate at lower frequencies.

Such a power gating technique for the purpose of power management involves a sleep control for determining whether or not a load is now imposed on each router and stopping supplying power to the router if the answer is NO and a wakeup control for quickly resuming supplying power to the router as soon as a load is generated there.

According to such a power gating technique, as sleep and wakeup controls need to be performed quite often depending on how much traffic has been generated, the latency could increase significantly. Thus, to cope with such a problem, according to Non-Patent Document No. 1, a control section for mitigating such latency is provided for each router.

However, if such a control section were provided specially, the design cost and part cost would increase to get the complicated control done.

Those problems with the related art are overcome by cutting down the latency by power gating and saving the power dissipated by an NoC as much as possible even without providing such a special-purpose control section for mitigating the latency for any router.

In one aspect of the present disclosure, a router is designed to be used in a data transfer system that includes a first node from which data is transmitted, a plurality of second nodes at any of which the data that has been transmitted from the first node is receivable, and a plurality of routers that relay the data to be transferred between the first node and each of the second nodes. The router includes: a load value processing section configured to obtain information about a load value of another router that is connected to a communications bus, the load value being a time delay caused by that another router and/or the throughput of that router; and an aggregation decision section configured to choose, in a situation where multiple traffic flows have been generated, one of the second nodes at which the data is to be received, and configured to determine a transmission path between the second node chosen and the first node in accordance with information about the load value obtained from each said router and information determined during a design process about the number of stages of routers from the first node through each said second node and/or the length of data to be transferred.

In one embodiment, the router further includes: a receiving section configured to receive data; a transmitting section configured to transmit information about the processing time delay; and a time delay processing section configured to obtain information about the processing time delay caused by another router that is connected to the communications bus. If the router is connected to any of the plurality of memories, the time delay processing section forwards information about the processing time delay at the receiving section to another router by way of the transmitting section.

In one embodiment, the router further includes: a receiving section configured to receive data of the traffic flow; and an analyzing section configured to analyze the amplitude of the traffic flow based on that data. The aggregation decision section aggregates the transmission paths and the memories based on the amplitude of the traffic flow.

In one embodiment, the router further includes a flow crossing decision section configured to determine, based on the destinations of the plurality of traffic flows, whether or not there is any crossing between the traffic flows. If there is any crossing, the flow crossing decision section configured to change the destination of at least one of the traffic flows, thereby minimizing crossing.

In one embodiment, the aggregation decision section aggregates the transmission paths and the memories if the traffic flows have been generated continuously but removes the transmission paths and the memories from the target of aggregation if the traffic flows have been generated intermittently.

In one embodiment, the second nodes are memories, and the aggregation decision section chooses one of the second nodes at which the data is to be received using information about memory speed determined during a design process, and information about information determined during a design process about the number of stages of routers from the first node through each said second node and/or the length of data to be transferred.

In another aspect of the present disclosure, a chip circuit includes: at least one bus master; a plurality of memories; and the routers above described. The routers are arranged on a communication bus that forms a network between the at least one bus master and the plurality of memories.

In one embodiment, the aggregation decision section provided for at least one of the routers aggregates the transmission paths to transfer those traffic flows through and memories to store data on those traffic flows, and stops operating the routers that no longer transfer any traffic flow as a result of the aggregation.

In one embodiment, the aggregation decision section provided for at least one of the routers aggregates the transmission paths to transfer those traffic flows through and memories to store data on those traffic flows, and stops operating the memories that no longer store data on any traffic flow as a result of the aggregation.

In one embodiment, the aggregation decision section provided for at least one of the routers aggregates the transmission paths to transfer those traffic flows through and memories to store data on those traffic flows, and stops operating the memories that no longer store data on any traffic flow as a result of the aggregation.

Hereinafter, embodiments of a router according to the present disclosure will be described with reference to the accompanying drawings. The router transfers data with a short delay.

Figure 1A:
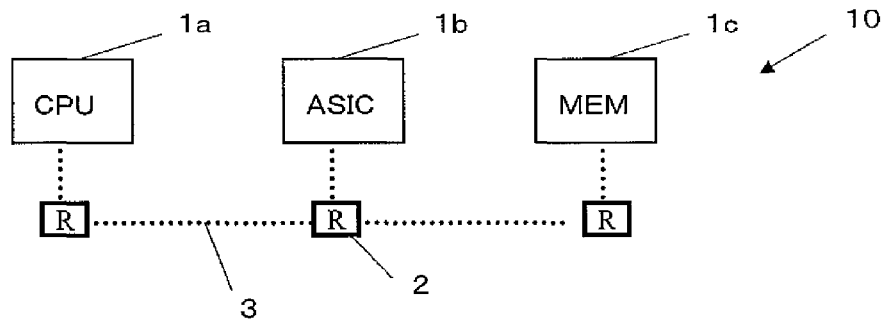
FIGS. 1A and 1B illustrate a configuration for a part of an NoC.
Figure 1B:
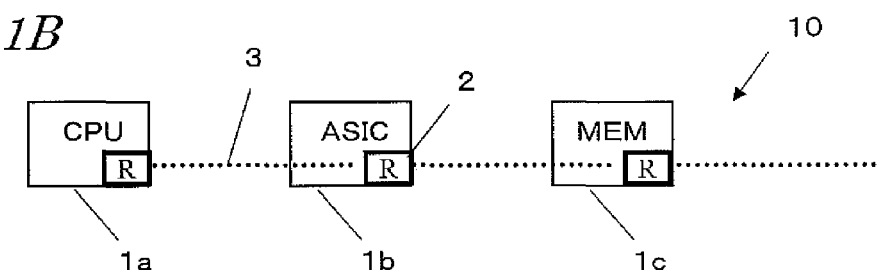

First of all, FIGS. 1A and 1B illustrate a configuration for a part of an NoC. Specifically, FIG. 1A illustrates an exemplary hardware connection and FIG. 1B is a schematic representation thereof. As shown in FIGS. 1A and 1B, bus masters 1*a*, 1*b* and 1*c*, all of which are integrated together on a single chip 10, are connected to the same bus 3 by way of their associated routers (R) 2.

Figure 2:
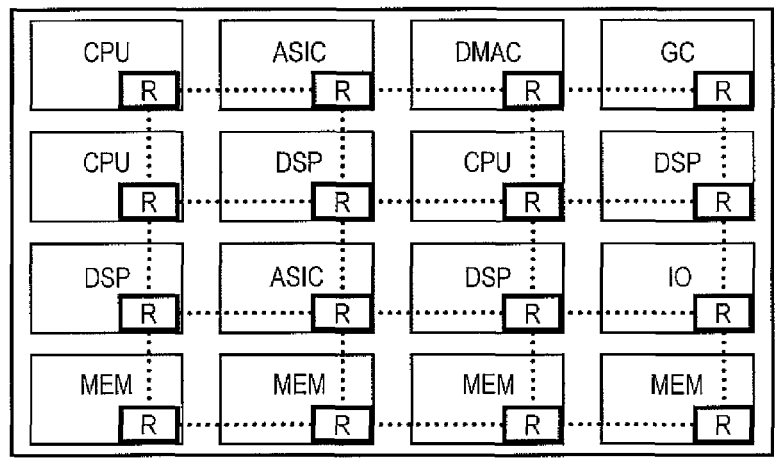
FIG. 2 illustrates an exemplary configuration for a general NoC in which a number of bus masters are coupled together to form a two-dimensional mesh.

FIG. 2 illustrates an exemplary configuration for a general NoC in which a number of bus masters are coupled together to form a two-dimensional mesh. In this example, a router R for performing a control on a data transmission path is provided for each of various bus masters including microprocessors, DSPs, memories and input/output circuits. And two adjacent ones of those routers R are connected (i.e., linked) together with a short line.

In the configuration shown in FIG. 2, each router is illustrated as being connected directly to its associated bus master. Actually, however, another functional section such as a network interface controller (which will be abbreviated herein as "NIC") is connected between each router and its associated bus master.

For example, the NIC may have the ability to perform conversion processing on a bus protocol or the ability to choose, from a plurality of memories, a memory that can provide the memory size required by the bus master and notify the bus master of that memory chosen. Also, the NIC and a memory controller are connected between a router and a memory. The NIC performs the bus protocol conversion processing, associates two data transmission paths toward, and from, the destination with each other, and replies the response of the return route to the going route to the NIC. Each memory controller is connected to an associated NIC and controls the order of accessing the memories, for example.

Hereinafter, the configuration of an NoC bus that is supposed to be used in an embodiment of the present disclosure will be described.

Figure 3:
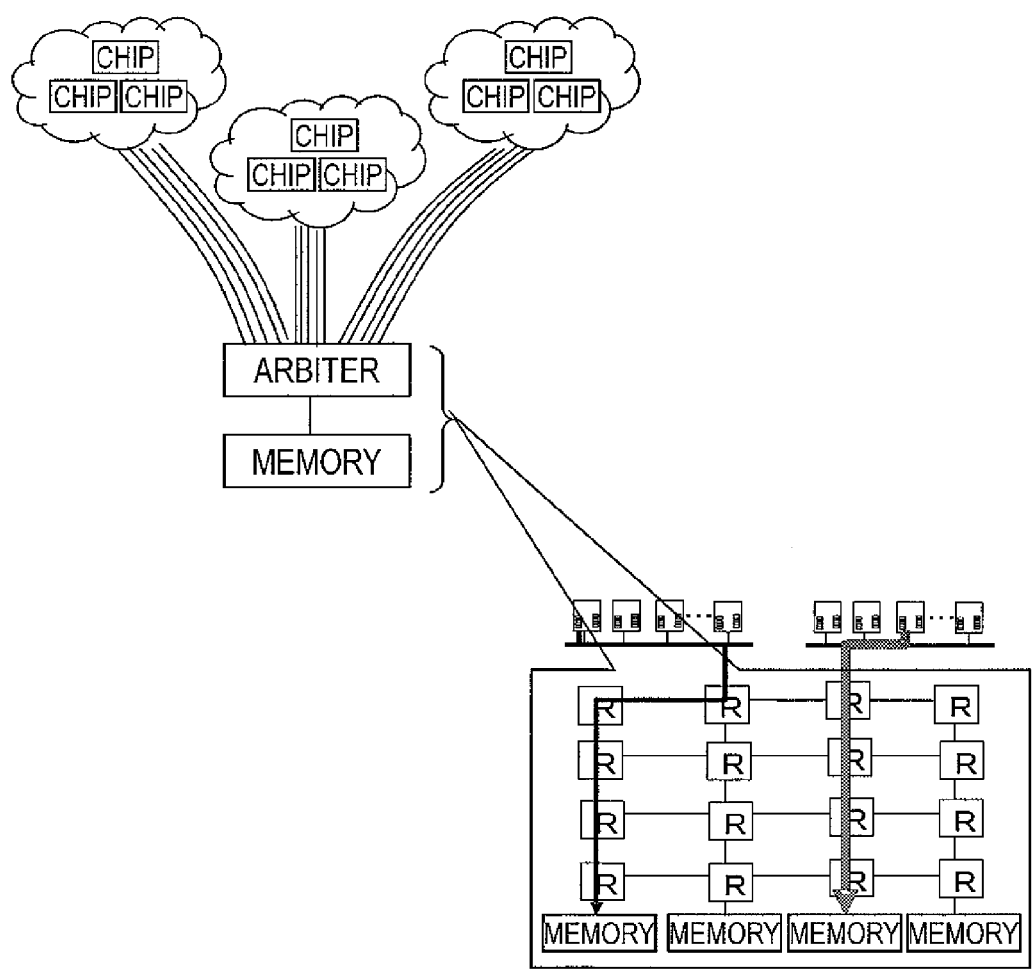
FIG. 3 schematically illustrates an example of an NoC on which the transmission paths are controlled by the route control method of a first embodiment.

FIG. 3 schematically illustrates an example of an NoC on which the transmission paths are controlled by the route control method of this embodiment. In the system shown in FIG. 3, provided is an arbiter which is connected to a memory on the one hand and to a single or multiple chips on the other hand. The single or multiple chips each perform Internet processing or multi-media processing. A detailed configuration for the arbiter and the memories is illustrated in the block shown on the right hand side of FIG. 3. That block shown on the right-hand side of FIG. 3 in which the arbiter and the memories are combined is connected to multiple chips shown at the top with two connection lines. However, this is just an example and any other number of lines may be used instead.

Those chips access the memories through the arbiter, of which the internal configuration is defined by an NoC. By distributing accesses to those memories using the NoC as shown in the block on the right-hand side of FIG. 3, the NoC can operate at a low operating clock rate without imposing an overload on a single bus. In the example illustrated in FIG. 3, there are two traffic flows, namely, Internet processing and media processing, which will interfere with each other on the transmission paths of the NoC in the arbiter, thereby causing a propagation delay.

Specifically, if TV sets and mobile phones with Internet access capabilities are connected together through a bus to form a network on chip, then a traffic flow that does require to be transferred with a short delay and a traffic flow that does not require that will be transferred over the network of the network on chip. Examples of such traffic flows with a high short delay transfer request level include a user's command about a TV channel selection, which is a kind of processing that needs to be done with as quick a response as possible. On the other hand, examples of traffic flows with a low short delay transfer request level include displaying a background for an Internet content to present, which is a kind of processing that does not require a quick response. If these different kinds of traffic flows congest the same network, those traffic flows will interfere with each other. That is to say, a traffic flow that permits some delay (i.e., a traffic flow with a low short delay transfer request level) will affect a traffic flow that needs to be transferred at a short delay (i.e., a traffic flow with a high short delay transfer request level).

In this embodiment, the traffic flows to transfer are supposed to have mutually different properties. Examples of parameters indicating those traffic properties include a traffic rate, the packet size on an application basis, the number of traffic flows, and the degree (or the level) of short delay transfer that the application demands.

In the NoC of this embodiment, a transfer slot with a predetermined time length is provided, and target information may be transferred either synchronously or asynchronously with the transfer slot. Also, a packet is supposed to be not discarded by any router but held until the packet can be transferred. Optionally, the interval at which packets are transmitted may be adjusted by introducing a flow control. According to this embodiment, the unit of data to transfer will be referred to herein as either a "packet" or a "flit".

Figure 4:
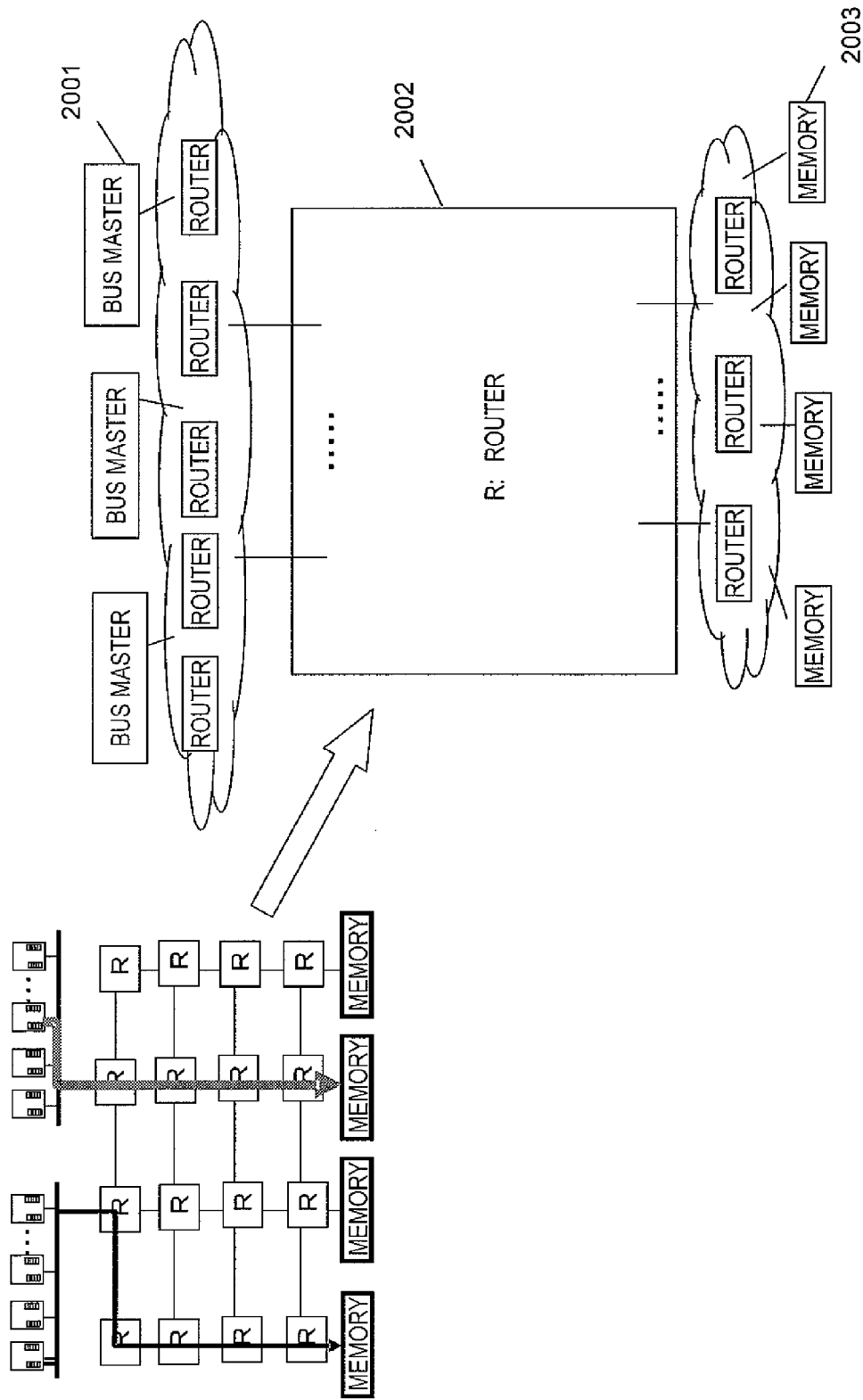
FIG. 4 illustrates how routers may be connected together.
Figure 5:
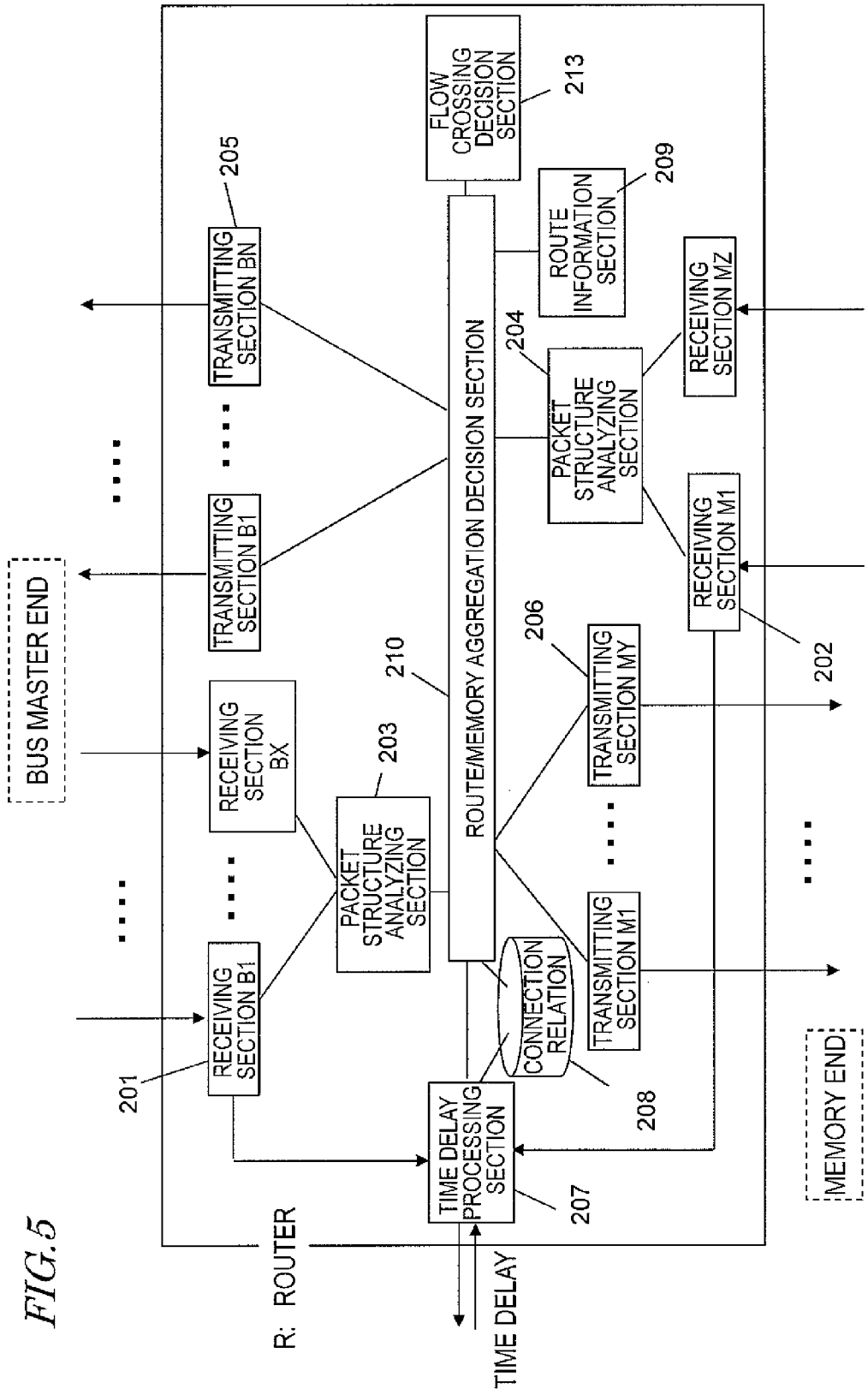
FIG. 5 illustrates an exemplary internal configuration for the router.

FIGS. 4 and 5 illustrate a configuration for the router.

FIG. 4 illustrates how bus masters 2001, routers 2002 and memories 2003 are connected together. In response to a request from a bus master 2001 (which may be a DSP, a CPU, or an IO, for example), an appropriate one of the memories 2003 is accessed through routers 2002 on multiple stages. By connecting those routers 2002 in multiple stages in order to distribute the load on traffic flows, the traffic jam on the transmission paths can be reduced. In addition, by providing multiple memories 2003 to prevent multiple traffic flows from attempting to access the same memory, the access load on the memories can be lightened.

FIG. 5 illustrates an exemplary internal configuration for the router. According to this configuration, a transfer from the bus master end to the memory end and a transfer from the memory end to the bus master end are controlled independently of each other.

The router includes receiving sections 201 and 202 and transmitting sections 205 and 206. Each of those receiving sections (B1, . . . and BX) 201 receives an instruction or a data stream from another router or bus master. Each of those receiving sections (M1, . . . and MX) 202 receives an instruction or a data stream from another router or memory. And each of the transmitting sections (B1, . . . BN) 205 and (M1, . . . MN) 206 transmits the instruction or data stream to the destination determined (i.e., another router or memory).

This router has two sets of receiving sections in order to process traffic flows coming from multiple routers, bus masters or memories concurrently, and also has two sets of transmitting sections in order to process traffic flows coming from multiple routers, bus masters and memories concurrently. Optionally, the receiving and/or transmitting sections may be provided in three or more sets or may form only a single set.

Also, in the configuration illustrated in FIG. 5, a reception buffer (not shown) is provided for each destination (i.e., on the bus master end or on the memory end) in order to process an access request from the bus master end and an access request from the memory end simultaneously.

The router further includes a packet structure analyzing section 203 or 204, a time delay processing section 207, a connection relation database 208, a route information section 209, a route/memory aggregation decision section 210 and a flow crossing decision section 213.

The packet structure analyzing section 203 or 204 analyzes the structure of a packet received and determines whether or not a short delay transfer is requested. The structure (i.e., the transfer format) of a packet will be described in detail later with reference to FIG. 8.

By reference to the connection relation database 208 that stores information about the connection relation of the router, the time delay processing section 207 decides either to collect or to transmit the time delays of traffic flows. More specifically, by way of the receiving sections (B1, . . . and BX) 201, the time delay processing section 207 receives reception status information from another router on the bus master end or from the bus master itself. That router may be the NIC described above. The reception status information may include not only the propagation time delay but also the buffer level, the packet stay time, a fluctuation in time delay (i.e., jitter), a transfer efficiency (i.e., a throughput), an acquisition enabled range at the receiving section and other load values on the transmission path or the bus master on the receiving end (e.g., a memory). And then the reception status information is transmitted to another router or a memory via the transmitting sections (M1 through MY) 206. Also, the time delay processing section 207 receives reception status information either from another router on the memory end or from the memory itself via the receiving sections (M1 through MZ) 202 and transmits that information to another router or the bus master via the transmitting sections (B1, . . . and BN) 205. As a result, data is transmitted to the destination determined.

The route information section 209 manages the route information.

The route/memory aggregation decision section 210 selects a router or memory as the destination. Such decision processing performed by the route/memory aggregation decision section 210 will also be referred to herein as "aggregation". In this description, to "aggregate" means reducing the number of memories and/or transmission paths to transfer traffic flows if there are a number of such memories and/or transmission paths. For example, if a number of traffic flows have been generated at the same time among a plurality of processors, to transmit a part or all of the traffic to the same memory will be referred to herein as "aggregating the memories". Also, to determine the transmission paths so that a part or all of the traffic is transferred through the same transmission path will be referred to herein as "aggregating the transmission paths". In the following description, if at least one of "aggregation of memories" and "aggregation of transmission paths" is involved, then such a situation will be referred to herein as "aggregation of the traffic".

The route/memory aggregation decision section 210 does aggregate a series of traffic flows that have been generated continuously but does not aggregate traffic flows that have been generated intermittently. By sorting and aggregating those traffic flows in this manner, even if a lot of traffic flows were generated intermittently, those intermittent traffic flows would be excluded from the target of aggregation. As a result, it is possible to avoid performing the aggregation processing too frequently and to cut down the overhead of the processing to get done to perform the route/memory aggregation processing. In this description, the "intermittent traffic flows" refer herein to a number of traffic flows issued by the bus masters or memories independently of each other. Among those intermittent traffic flows, their sources or destinations have nothing to do with each other. On the other hand, the "series of traffic flows that have been generated continuously" refer herein to a number of traffic flows that are correlated to each other among the bus masters or the memories. Among those continuous traffic flows, their sources or destinations have something to do with each other. It should be noted that the intermittent traffic flows and the continuously transferred traffic flows are both transferred through the same memories or transmission paths.

The flows crossing decision section 213 determines whether or not there is crossing between the flows at the router. The flow crossing decision processing will be described in detail later with reference to FIGS. 14A to 14C.

Figure 6:
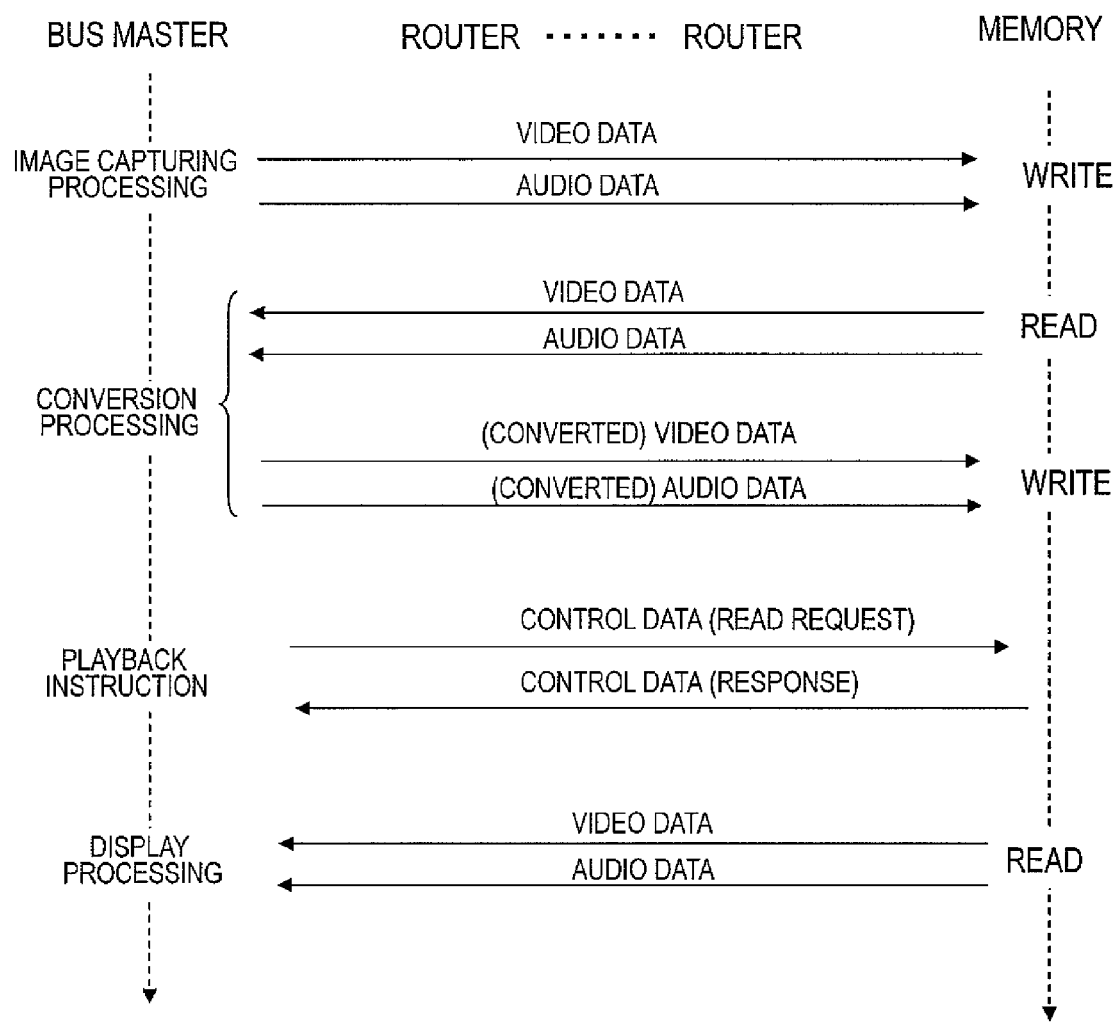
FIG. 6 shows the flows of data that are related to the processing to get done by an image capture device in a situation where the user shoots video and plays back the video that has been shot using the image capture device such as a camera built in his or her cellphone or a movie camera.

FIG. 6 shows the flows of data that are related to the processing to get done by an image capture device in a situation where the user shoots video and plays back the video that has been shot using the image capture device such as a camera built in his or her cellphone or a movie camera. In FIG. 6, shown are the memory's operations to be performed in association with the bus master's various processing and examples of data to be exchanged between the bus master and the memory via the router.

For example, when the bus master performs image capturing processing, video data and audio data are transmitted to, and written in, a memory. On the other hand, when conversion processing is performed, the video data and the audio data are read from the memory and converted by the bus master, and then the converted video and audio data are sent to, and written in, the memory.

Hereinafter, it will be described specifically by way of this illustrative example what traffic flows are processed in this embodiment.

The bus master corresponds to a terminal device such as a processor or an I/O which carries out image capturing, conversion, playback instruction or display processing. The memory corresponds to an external memory such as a DRAM or an SD memory card or an internal memory such as an SRAM. Optionally, multiple memories may be provided and their performances do not have to be the same. On top of that, those memories do not have to be provided at physically the same position, either. But any required number memories may be provided at multiple positions.

The image capture device performs the image capturing processing, conversion processing, playback instruction processing, and display processing in the order shown in FIG. 6. Hereinafter, it will be described in that processing order exactly what traffic flows will be generated.

First of all, when image capturing processing is performed, video data and audio data that have been obtained with a camera and a microphone are once written in a memory. Since the video data and audio data are generated in real time, the short delay transfer request level is high when data is transferred from the bus master to the memory.

Next, when conversion processing is carried out, the image coding method of the video data that has been obtained as a result of the image capturing processing is converted into another image coding method suitable for playback processing (e.g., from JPEG into MPEG). As for the audio data, the coding method is also converted if necessary. Such coding method conversion processing is sometimes called "transcode processing".

In performing the transcode processing, the video data and audio data that are stored in the memory are read, subjected to the conversion processing by a DSP, for example, and the result is written in the memory. As the transcode processing can be carried out as background processing while the image capturing processing is being performed, the short delay transfer request level between the bus master and the memory becomes the lowest during the conversion processing.

Next, the playback instruction is issued in response to the command that has been given by the user who is operating the terminal device. When the playback instruction is issued, control data that is related to a request of reading the video data and audio data that are stored in the memory in question is transmitted from the bus master to the memory. In response, control data is returned from the memory to the bus master. That control data to transmit and receive has the highest short delay transfer request level. The reason is that such control data should be processed preferentially prior to any other data in order to increase the user's operability.

Finally, in accordance with the user's playback instruction, the video data and audio data requested are read from the memory and transferred to the bus master. In order to increase the user's operability, the video data and audio data to be transferred to the bus master have as high a short delay transfer request level as in the image capturing processing.

In the following description, an embodiment of the present disclosure will be described specifically with respect to this application that is taken as an example. However, that is just an example of the present disclosure and the present disclosure is in no way limited to that application.

Figure 7:
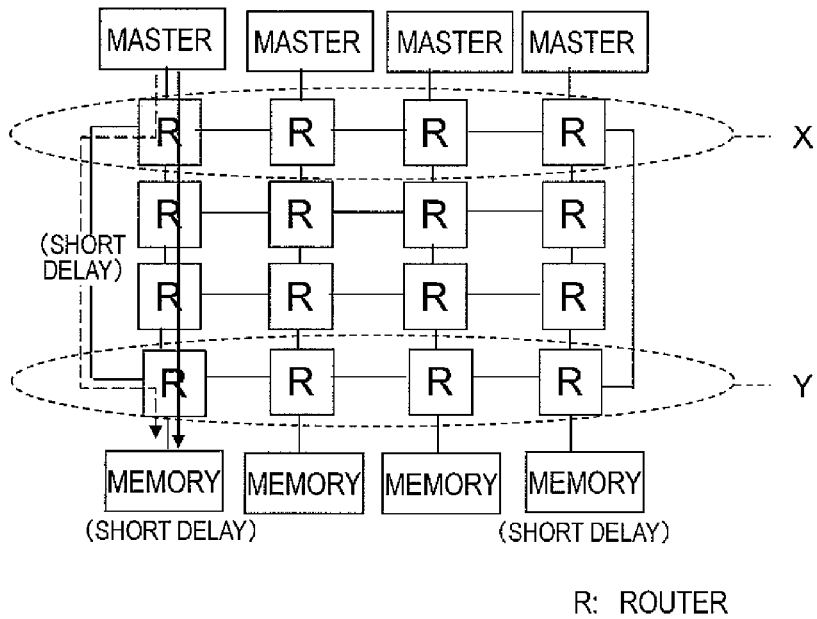
FIG. 7 illustrates the network structure of an NoC that realizes a short delay transfer.

FIG. 7 illustrates the network structure of an NoC that realizes a short delay transfer. In the example illustrated in FIG. 7, a route that does bypass the processing to relay and a normal route that does not bypass that processing are shown as two different routes. Also shown in FIG. 7 differently are memories with a high short delay request level and other memories. As a memory that stores only a traffic flow, of which the short delay request level is higher than a predetermined level (e.g., a traffic flow generated during the image capturing processing), an SRAM or any other physically fast memory may be used. On the other hand, as a memory that stores only a traffic flow, of which the short delay request level is not higher than the predetermined level, a DRAM or any other non-physically-fast (i.e., physically slow) memory may be used. It will be described in detail later exactly how to choose a bypass route and how to choose a memory to store a traffic flow with a high short delay request level. The bypass route does not have to be set exactly as in the example illustrated in FIG. 7. Optionally, a bypass route may be set for every router, too. Furthermore, such a memory that requires a short delay transfer does not always have to be set, either.

Figure 8:
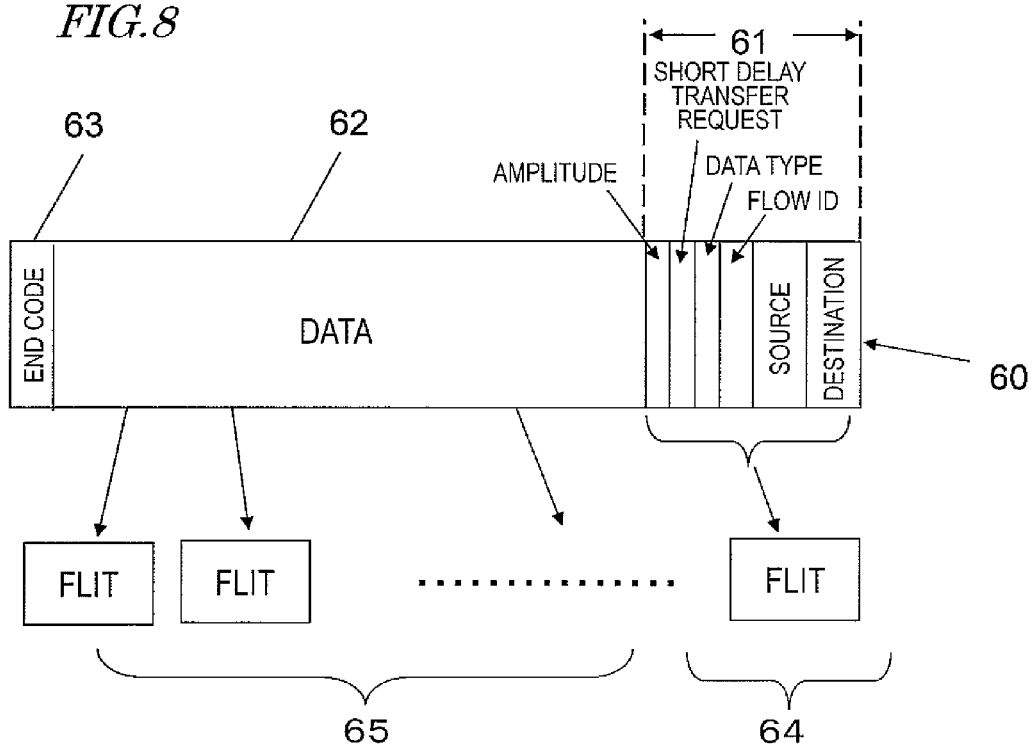
FIG. 8 illustrates an exemplary transfer format for a packet 60 and how the packet 60 may be divided into a group of flits.

FIG. 8 illustrates an exemplary transfer format for a packet 60 and how the packet 60 may be divided into a group of flits 64, 65.

The packet 60 includes a header field 61, a data field 62, and a control code field 63. The flit 64 is used mainly to transfer the header field 61. On the other hand, the group of flits 65 is used mainly to transfer the data field 62.

In the header field 61, described from the right to the left in FIG. 8 are the destination address, the source address, the flow ID, the data type, information indicating the quality required (such as a short delay request level or type) and information about the amplitude. The data to transfer is described after these pieces of information.

The short delay request level (or type) may be described in any form (e.g., represented as multiple values). For example, user interface processing, of which the short delay request level is so high as to need a fast response (e.g., playback instruction in the example shown in FIG. 6), is given a low numerical value. On the other hand, the transcode processing of video, of which the short delay request level is low enough to perform it as background processing (e.g., conversion processing in the example illustrated in FIG. 6), is given a high numerical value. In this case, the higher the short delay request level, the lower the numerical value allocated may be.

Next, the amplitude of a traffic flow will be described. As the quantity of video data required changes according to the video playback rate, the rate of transfer from the memory to the bus master and the amplitude of the traffic flow also change with the video playback rate. More specifically, if video is played back at 2× rate, then the quantity and amplitude of the traffic flow need to be doubled. The amplitude of the traffic flow is determined by the type of the data to use (which may be text data or moving picture data, for example) and by the playback rate.

In the data field 62, described are video data and audio data, for example. In the control code field 63, a predetermined end code of the packet 60 may be described, for example.

Among these data described in the header field 61, the packet relay processing and the packet receiving processing on the receiving end are carried out based on the destination address and the source address. Also, the transmission path is determined according to the short delay request type.

The bus master on the transmitting end transfers a packet after having broken down the packet into smaller packet units called "flits". In response, the memory on the receiving end restores those flits transferred into the original packet. As in the example illustrated in FIG. 8, the lengths of those flits may be determined by reference to the lengths of fields to describe the control data in (such as the destination address field, the source address field and the short delay request type field).

For example, one packet may have a size of 128 bytes and one flit may have a size of 32 or 64 bits. It should be noted, however, that the one packet and one flit sizes could vary according to the intended application and these are nothing but examples.

FIG. 9 shows exemplary properties of flows that run through an NoC.

An ID to identify the flow, an item to recognize the data type, an item indicating the degree of short delay request, and an item indicating a property of a traffic flow are provided for each flow. In the example shown in FIG. 9, the lower the numerical value, the higher the short delay transfer request level. As already described for the example shown in FIG. 6, control data such as a playback instruction has the highest request level.

According to this embodiment, the amplitude of a traffic flow is adopted as a property of the traffic flow. In this description, the "amplitude of a traffic flow" indicates how much the magnitude of the traffic flow could vary with time. And the amplitude is represented by how much the amplitude varies with respect to the average amplitude (i.e., average magnitude of a traffic flow). For example, "±30%" indicates that the amplitude could vary by ±30% with respect to the average amplitude. In this case, the greater this numerical value, the more significantly the traffic load will vary.

If a traffic flow is transferred as packets over a network, a traffic flow with large amplitude and a short period will be transferred as relatively long packets at short transmission intervals. On the other hand, a traffic flow with small amplitude and a long period will be transferred s relatively short packets at long transmission intervals. In this manner, one period of a traffic flow may also be defined as a property of the traffic flow.

Those pieces of information about the data type, the short delay transfer request level, and the amplitude of a traffic flow may be obtained in advance by expecting a traffic flow when a semiconductor device is designed. Also, considering that an unexpected traffic flow will actually be generated (as a result of a user's operation, for example) in addition to those expected when the semiconductor device is designed, those pieces of information may be collected by using the respective routers while the semiconductor device is operating. By reference to that flow property, a transmission path and a memory are selected by the method to be described later. The information about the flow property to be stored in the route/memory aggregation decision section 210 will be erased unless no flows are transferred for a predetermined amount of time or more. Optionally, routing may also be determined based on the flow property that is stored in the route/memory aggregation decision section 210.

The receiving sections 201 and 202 of the router receive a packet in the transfer format shown in FIG. 8. The packet structure analyzing sections 203 and 204 analyze the packet received and store the result of the analysis in the route/memory aggregation decision section 210. The items stored in the route/memory aggregation decision section 210 may be the ones shown in FIG. 9. According to this embodiment, the "amplitude" of a traffic flow is supposed to be one of its properties as described above.

Figure 10:
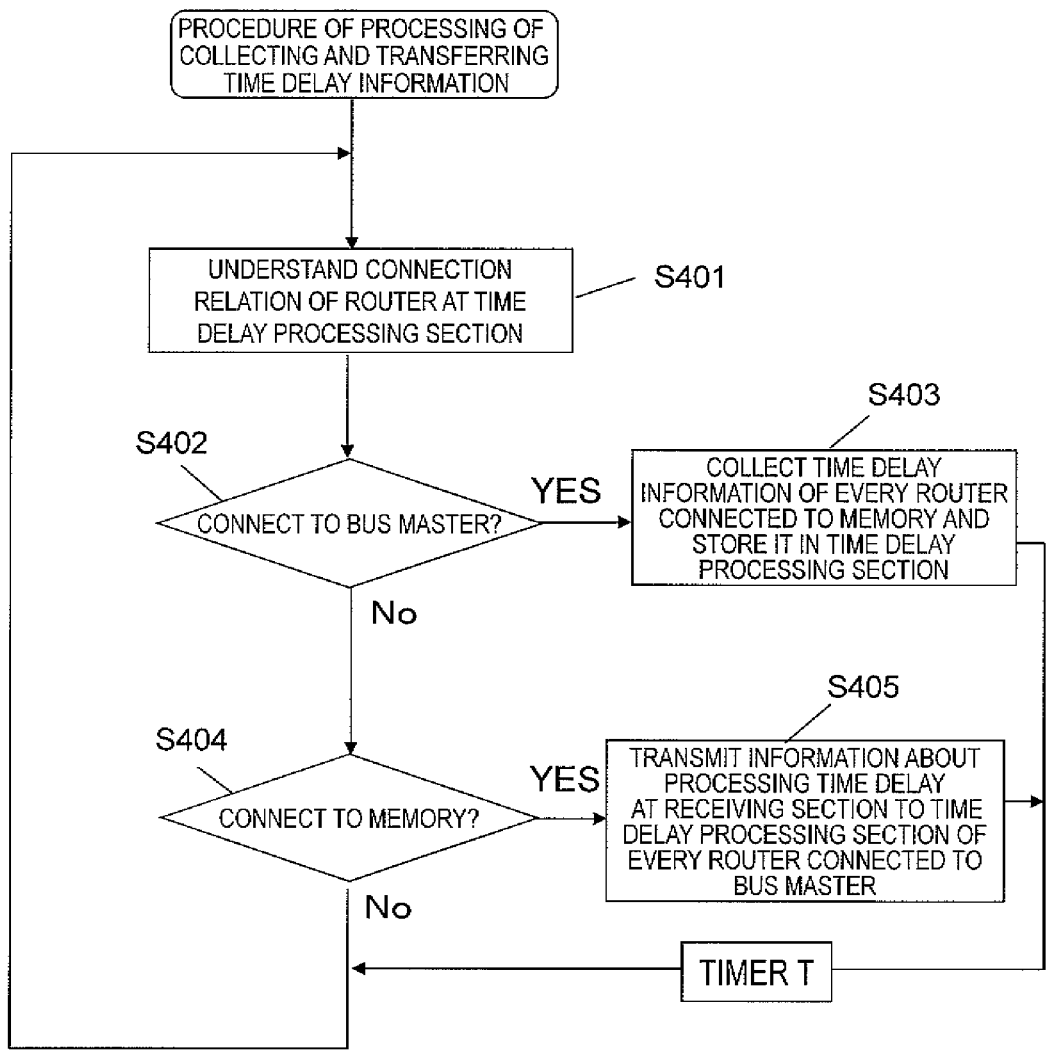
FIG. 10 is a flowchart showing the procedures of processing of collecting and transferring information about the time delay.

FIG. 10 is a flowchart showing the procedures of processing of collecting and transferring information about the time delay.

First of all, in Step S401, the time delay processing section 207 understands the connection relation of the router by reference to the connection relation database 208. Next, in Step S402, the time delay processing section 207 determines whether or not the router to which the time delay processing section 207 itself belongs (which will be referred to herein as "its own router") is connected to a bus master. If the answer is YES just like the group of routers X shown in FIG. 7, the process advances to Step S403. Otherwise, the process advances to Step S404. In Step S403, the time delay processing section 207 collects information about the time delay of every router that is directly connected to the memory and stores that information in itself.

On the other hand, in Step S404, the time delay processing section 207 determines whether or not its own router is connected to a memory. If the answer is YES just like the group of routers Y shown in FIG. 7, the process advances to Step S405. Otherwise, the process goes back to Step S401.

In Step S405, the time delay processing section 207 transmits information about the processing time delay at the receiving section 201 of its own router to every router that is directly connected to the bus master. In this case, the destination is either the address of the router that has made an inquiry or a preset address. The router that is connected to the bus master (i.e., the group X of routers shown in FIG. 7) determines the transmission path and the memory based on the time delay obtained. The routers (e.g., the group X of routers shown in FIG. 7) may be the NIC described above. Also, generally speaking, in an application on which a real time constraint is imposed, information often needs to be transferred within the time delay that is defined during the design process (i.e., a permitted time delay). And based on this permitted time delay, each bus master may determine the transmission path and the memory. Furthermore, in an application with a long permitted time delay, the throughput is often given a high priority. That is why in that case, each bus master may determine the transmission path and the memory based on either the throughput or the acquisition enabled band.

The time delay information may be transmitted on a regular basis from the routers described above. Or a request may be sent from the time delay processing section 207 to the routers described above and the time delay information may be transmitted as a response to that request from the routers. The time delay information may be represented as either the data stay time at the receiving section 201 or the number of packets processed per unit time.

If the implementation is done by dimensional forward routing or any other ordinary routing for an NoC or if the destination memory is selected with a network structure in which a transmission path to a memory is determined uniquely (e.g., a butterfly structure) specified during the design process, then the route is determined uniquely. By collecting information about the time delay to be caused by the router that is connected to the memory, the access load on the memory can be collected mainly.

The propagation delay may be measured on a route leading from the bus master to the memory. Also, not just the time delay information but also an amplitude value may be collected as well.

A method for collecting time delay information based on the reception status of the receiving section 201 of the router, which is connected just before a memory, when data is transferred from the bus master to the memory has been described. By collecting the time delay information based on the reception status of the receiving section 202 of the router that is connected just before a memory, from which data is transferred to the bus master in response to a request of transferring data from the bus master to the memory, the memory and the transmission path may be selected on the time delay basis not only on the way from the bus master to the memory but also on the way back from the memory to the bus master as well. Although the description of this embodiment is focused on the way of transferring data from the bus master to the memory, the same method is also applicable to the way back from the memory to the bus master.

A detailed method for selecting a memory and a transmission path with the propagation delay caused by the router also taken into account will be described later.

Next, the processing of aggregating traffic flows according to this embodiment will be described. First of all, it will be described exactly how to aggregate traffic flows and then it will be described how the routers operate for the purpose of aggregation.

FIG. 11 illustrates an example in which traffic flows are aggregated and the routers are selectively operated based on an estimation equation.

Portion (A) of FIG. 11 shows a situation where traffic flows are being transferred from Master #k to Memory #k (where k is an integer of one to four). This is an initial transfer state, in which every router is relaying the traffic flows. It should be noted that some traffic flows with relatively high short delay transfer request levels run through transmission paths that are specially provided for short delay transfers.

If there were any transmission path with a low traffic flow transfer rate or any memory with a low writing speed, then the routers should continue to operate even though there are a few traffic flows to relay and transfer. For that reason, such a memory and/or transmission path to use and another memory and/or transmission path are aggregated together, thereby making a maximum use of the capabilities of the resource(s). Then, there can be a memory and/or transmission path through which no traffic flows are transferred. And by stopping operating the routers that do not relay any traffic flows, the power can be saved.

Portion (B) of FIG. 11 illustrates a specific example in which those traffic flows are aggregated together based on the estimation equation and only routers that need to relay the traffic flow are operated. By aggregating the memories and transmission paths together based on the estimation equation to be described later, some transmission paths no longer need to relay any traffic flows and the routers RO that do not relay any traffic flows are made to stop operating. In this description, "to stop operating" means either turning the power OFF or bringing it to a sleep mode. As a result, the power can be saved. It should be noted that the "turned OFF state" refers herein to stopping supplying power to every group of circuits in the router. On the other hand, the "sleep mode" refers herein to either stopping supplying power or a clock pulse to some of the group of internal circuits in the router or continuing to supply power or a clock pulse at a decreased rate.

FIG. 12 shows an example of memories and transmission paths to use that have been determined according to the properties of the traffic flows.

In the example illustrated in FIG. 12, memories to store the data of traffic flows are selectively used according to the amplitude of a given traffic flow. Specifically, Memory #1 stores the data of a traffic flow with an amplitude of ±5%, Memory #2 stores the data of a traffic flow with an amplitude of ±10% and Memory #3 stores the data of a traffic flow with an amplitude of ±30%. Also, a traffic flow with a high short delay transfer request level runs through a short delay transmission path. And for each of the other traffic flows, a transmission path that can transfer the traffic flow to the destination memory in the smallest number of relays is selected.

By aggregating the transmission paths and memories as shown in FIG. 12, the routers RO no longer need to relay any traffic flows and Memory #4 no longer needs to store any data. As a result, the routers RO and Memory #4 can have their operations stopped.

As described above, the traffic flows are aggregated together so as to use particular memories and particular transmission paths with the quality of transfer taken into account. As a result, there can be transmission paths that do not relay any traffic flows, and the routers that do no longer relay any traffic flows and the memories that do no longer store any traffic data can be either turned OFF or brought to a sleep mode. Consequently, the power can be saved.

In the example illustrated in FIG. 12, traffic flows are allocated to respective memories so that multiple traffic flows with similar traffic flow amplitudes are allocated to the same memory. However, such an allocation method is just an example. Conversely, the memories and transmission paths may also be determined so that traffic flows with different amplitudes are allocated to respective memories in as many cases as possible. If traffic flows with the same amplitude are stored in the same memory, the quality of transfer can be ensured easily. In contrast, if traffic flows with different amplitudes are allocated to respective memories, the loads on the respective memories can be more uniform.

Next, it will be described how the transmission paths may be determined by reducing crossing between multiple traffic flows in order to minimize the congestion and use the given resources more efficiently.

Portions (A) and (B) of FIG. 13 illustrate how traffic flows are changed before and after the number of times of crossing between the traffic flows has been reduced at the routers.

Portion (A) of FIG. 13 illustrates an example in which the memories and transmission paths have been selected according to the properties of the traffic flows as in the example shown in FIG. 12.

Now take a look at the traffic flows to be relayed by the routers that are arranged right under Masters #2 and #3. First off, a traffic flow directed from Master #4 toward Memory #1 and a traffic flow directed from Master #2 toward Memory #2 cross each other. The traffic flow directed from Master #4 toward Memory #1 also crosses a traffic flow directed from Master #3 toward Memory #3.

"Crossing" occurs when two different sets of the transmitting sections (B1 through BN) 205 and (M1 through MY) 206 shown in FIG. 5 are used to relay the data of two traffic flows that pass different routers. In other words, if the transmitting sections need to be changed to transmit the data of different traffic flows, then it can be said that the traffic flows should cross each other.

FIG. 14A shows three traffic flows that cross each other. In the example illustrated in FIG. 14A, data is supposed to be transmitted to the destination addresses B and D using two different transmitting sections. Look at the traffic flow to be transferred from the address A to the address B (i.e., a traffic flow on the main route), and it can be seen that two traffic flows that are transferred from the address C to the address D cross that former traffic flow. Thus, it can be said that the traffic flow to be transferred from the address A to the address B crosses the two traffic flows to be transferred from the address C to the address D.

The flow crossing decision section 213 shown in FIG. 5 determines whether or not such crossing has occurred. FIGS. 14B and 14C show the crossing information tables managed by the flow crossing decision section 213.

Information about crossing flows is described on the crossing information tables.

In the example shown in FIG. 143, identification numbers (flow IDs) to identify the traffic flows and the source and destination addresses of those flows are described on the crossing information table. Specifically, in the example shown in FIG. 14B, the traffic flow identified by the identification number 1 has source address A and destination address B. It can be determined by reference to the combinations of source and destination addresses described on the crossing information table whether or not there is any crossing between the flows.

Meanwhile, in the example shown in FIG. 14C, identification numbers (flow IDs) to identify the traffic flows and the transmitting sections to be used by their routers are described on the crossing information table. Specifically, in the example shown in FIG. 14C, the flow identified by the identification number 1 is transferred to another router or a memory using the transmitting section M1. The flow crossing decision section 213 determines whether or not the transmitting sections described on the crossing information table agree with each other between multiple traffic flows. If the answer is YES, no crossing will occur. Otherwise, crossing will occur.

The router where crossing has occurred has to do the processing of classifying the packets being transferred, thus causing congestion easily. However, such congestion should be minimized by eliminating crossing at any router.

FIG. 13(B) illustrates an example in which memories and transmission paths have been selected so as to avoid crossing. By changing the traffic flow to be transferred from Master #4 to Memory #1 with a traffic flow to be transferred from Master #4 to Memory #4, crossing can be reduced. In addition, by changing the traffic flow to be transferred from Master #1 to Memory #3 with a traffic flow to be transferred from Master #1 to Memory #2, crossing can also be reduced. As a result, the traffic flow interference at the routers can be reduced and the congestion should be minimized.

By aggregating the traffic flows together by the method described above so as to use particular memories and particular transmission paths with the quality of transfer (i.e., the properties of the traffic flows and whether or not there is any crossing) taken into account, there can be transmission paths that do not relay any traffic flows, and the routers that do no longer relay any traffic flows can have their operation stopped. Consequently, the power can be saved. Optionally, although the aggregation processing becomes more complicated than the method shown in FIG. 12, the power management can also be carried out with the quality of transfer shown in FIG. 12 further improved.

FIG. 15 is a flowchart showing the procedure of processing to get done by a router. To begin with, it should be noted that the processing shown in FIG. 15 is not performed by every router. But the processing shown in FIG. 15 is performed by the router that is directly connected to a bus master (i.e., a router belonging to the group X of routers shown in FIG. 7) when that router receives data (or flits) from that bus master. The traffic flows are not aggregated by routers that relay the traffic flows. If a traffic flow that has just been generated is received and aggregated by the same router, the capabilities of the resources can be made use of even more efficiently.

Also, some traffic flow may be transmitted from a memory to a bus master. In that case, such a traffic flow may be aggregated by the router that is directly connected to that memory (i.e., a router belonging to the group Y of routers shown in FIG. 7) when that router receives data (or flits) from that memory.

The other routers may relay as usual the traffic flows they have received. The procedure of such processing performed by the other routers will not be described.

The router that performs the processing shown in FIG. 15 receives flits from either another router or a bus master and then transfers those flits to a memory or a router in the following procedure of processing.

According to the processing shown in FIG. 15, if an application to process audio data or control data, for example, which uses a traffic flow with small amplitude and demands a short delay transfer (e.g., an IP phone to be realized as a multi-function mobile phone that is implemented as an NoC or audio reproduction), is up and running, traffic flows are aggregated using the estimation equation. By using that estimation equation, traffic flows can be aggregated into memories and transmission paths with various elements that could cause a delay (such as loads on routers, the number of stages of the routers and the data length) taken into account.

On the other hand, if an application that uses a traffic flow with large amplitude such as a video or Web function related traffic flow (e.g., terrestrial digital telecast receiving processing or video playback) is up and running, then the memories and transmission paths are determined according to the amplitude of the traffic flow. By aggregating together traffic flows with similar amplitudes (such as a video related traffic flow and a Web function related traffic flow), the transfer efficiency should be increased while making the aggregation due to the multiplex effect of the traffic flows. It should be noted that even if traffic flows with large amplitudes are aggregated together, the circuit can still be designed so as to avoid shortage of transfer bands. The reason is that statistically speaking, a bus master and a memory will never transfer traffic flows simultaneously and continuously at amplitude that is close to maximum one. This is so-called "multiplex effect of traffic flows". Even if the amplitude of one traffic flow has decreased, the transfer bands can still be used efficiently by increasing the amplitude of the other traffic flow.

First of all, in Step S701, the receiving section 201 receives data on a flit by flit basis from a bus master. The packet structure analyzing section 203 restores the data stream (i.e., packet) shown in FIG. 8 based on that data that has been received on a flit basis, finds the destination, breaks down the packet into flits again, and then performs relay processing.

Next, in Step S702, the route/memory aggregation decision section 210 determines whether or not to aggregate the traffic flows by using the estimation equation. This decision can be made either statically during the design process or dynamically according to the quality demanded by the application (which can be determined by the "short delay request" field of the flit shown in FIG. 8).

If the answer to the query of the processing step S702 is YES, the process advances to Step S703. Otherwise, the process advances to Step S706.

In Step S703, the route/memory aggregation decision section 210 collects information about the time delays (D) caused by the respective routes. Next, in Step S704, the route/memory aggregation decision section 210 chooses a memory that accepts a high short delay request level and chooses a route leading to that memory with the shortest time delay. Such a "memory that accepts a high short delay request level" is an SRAM or any other high-speed memory that has already been specified during the design process or the implementation process. A specific route choosing method will be described in detail later with reference to FIG. 16.

In the meantime, the packet structure analyzing section 203 analyzes the amplitude of the traffic flow based on the received data in Step S706, and then gets the amplitude of the traffic flow for each memory in Step S707. In this case, the amplitude of a traffic flow to be stored in each memory may be defined for each router or information about the amplitude of a traffic flow may be retrieved from a storage section that defines a correlation between each memory and its associated traffic flow amplitude.

As a result, based on the result of analysis of the packet and the definition of the traffic flow amplitude to be stored in each memory, the route/memory aggregation decision section 210 chooses a memory with the closest traffic flow amplitude (in Step S708).

Next, the route/memory aggregation decision section 210 of each router searches for any crossing that has occurred (in Step S709) and determines whether or not crossing has occurred at the router (in Step S710). If the answer is YES, the process advances to Step S711, in which the route/memory aggregation decision section 210 chooses another memory again and attempts to eliminate that crossing. Even if every memory has been chosen again but if crossing has been detected in each of them, then memories are chosen at random or one of the memories that has the shortest route is chosen. On the other hand, if the decision section 210 has decided that no crossing has occurred at the router, then data starts to be transmitted from the bus master.

FIG. 16 is a flowchart showing a detailed procedure of the processing step S704 shown in FIG. 15. According to this embodiment, an estimation equation is defined in order to aggregate memories at the destination and/or the transmission paths. This estimation equation takes into account not only the "time delay (D) of a traffic flow that demands a short delay", which is a parameter reflecting mainly an access load on the memory, but also the "number of stages (H) of routers to the target memory" and the "data length (L) of the data to transfer" that would affect the time delay to be caused by the relay processing by the router. In this manner, a memory as the destination and a transmission path are selected. The estimation equation is defined to be H×L×D.

Specifically, first of all, in Step S901, pieces of information about the time delay (D) of a traffic flow that demands a short delay, the number of stages (H) of routers to the target memory and the data length (L) of the data to transfer are collected from a router.

The information about the time delay (D) of a traffic flow that demands a short delay is collected by the time delay processing section 207 shown in FIG. 5, which collects information about the time delay from a router that is connected to the memory (i.e., a router belonging to the group Y of routers shown in FIG. 7). The time delay processing section 207 of a router that is connected to the memory collects, as the time delay information, various kinds of information about the packet stay time at the receiving section 201, a variation in the stay time, and the percentage of the residual part of the packet.

The "number of stages (H) of routers to the target memory" is the number of intervening routers that are arranged before the target memory. As described above, the number of stages of routers is determined uniquely by method of arranging bus masters and memories during the design process. Thus, information about the number of stages of routers to each memory may be given to each router in advance. Alternatively, considering how easy it will be to modify the system configuration, pieces of information about the numbers of stages of routers from respective routers to respective memories May be collected at a certain point on the system and any of those pieces may be retrieved as needed.

The "data length (L) of the data to transfer" is the data to be defined during the design process. And data is processed based on that data length that is defined as a fundamental unit for performing processing on routers, bus masters and memories during the design process. Optionally, considering how easy it will be to modify the system configuration, pieces of information about the numbers of stages of routers from respective routers to respective memories may be collected at a certain point on the system and any of those pieces may be retrieved as needed to make the routers, bus masters and memories operate.

In general, the data length is determined by the quality of transfer that a given application demands. For example, as to an application that has a high short delay request level, a short delay transfer can get done by decreasing the data length. Also, if a high throughput is required, a high throughput transfer can get done by increasing the data length.

Next, in Step S902, the route/memory aggregation decision section 203 makes a routing computation (by the estimation equation H×L×D) based on these pieces of information. Then, the destination of transfer is determined with respect to a route with the smallest one of the estimated values that have been calculated by the estimation equation and that are equal to or smaller than a threshold value so that the largest number of flows comes first or that the numbers of flows become uniform.

By adopting the method that has been described with reference to FIGS. 15 and 16, memories and transmission paths can be selected with not only the access load on the memories but also the propagation delay caused by the routers taken into account.

FIG. 17 shows specific examples of estimated values on which a memory and a route are selected.

As parameters for calculating estimated values, the number of stages (H) of routers from a bus master to a memory, the length (L) of a packet, and the propagation time delay (D) from a bus master to a memory are used. As a specific exemplary method for calculating the estimate value, the numerical values of these parameters may be multiplied together.

Although the estimation equation is supposed to be defined by multiplication in this embodiment, this embodiment is not necessarily limited by the method of calculating with the estimation equation. For example, the estimation equation may also be defined by addition and subtraction. Specifically, if the estimated value is calculated by addition equation (e.g., if the estimated value=H+L+D), a weight may be added to only a particular item (e.g., only the propagation time delay) with the computational complexity reduced and the estimation can be made with a top priority given to that item. Also, any estimation equation may be used as long as a result of estimation can be calculated based on the number of stages (H) of routers from a bus master to a memory, the length (L) of a packet, and the propagation time delay (D) from a bus master to a memory. Nevertheless, not all of the number of stages (H) of routers, the length (L) of a packet, and the propagation time delay (D) have to be used as indices. Rather a memory and a transmission path just need to be selected by using at least one of these indices.

As can be seen from the example shown in FIG. 17, the larger the number of stages of routers, the higher the estimated value (as indicated by (1) in FIG. 17), the longer the data length, the higher the estimate value (as indicated by (2) in FIG. 17), and the longer the time delay, the higher the estimate value (as indicated by (3) in FIG. 17). In the example shown in FIG. 17, it can be seen that the higher the estimated value of a route, the less suitable for short delay transfer the route is. Based on the numerical value of the flow property indicating the short delay request level described above, a transmission path and a memory that meet the estimated value obtained are selected. Also, the relation between the numerical value indicating the short delay request level and the estimated value is defined in advance (e.g., during the design process) and a transmission path and a memory are selected by reference to that relation during the operation.

Hereinafter, it will be described with reference to FIG. 17 exactly how to make the aggregation.

In the example shown in FIG. 17, "4", "8" and "16" have been calculated as estimated values for respective routes. Suppose the threshold value is defined to be 8. In the example shown in FIG. 17, the destination of transfer is determined with respect to a route with the smallest estimated value so that the numbers of flows become uniform. The routes with the smallest estimated value are Routes #1 and #3 that have an estimated value of "4". In the example shown in FIG. 17, Route #1 is selected so as to minimize the difference in the number of flows. According to this method, instead of achieving some degree of aggregation effect, the estimated value of a route does not exceed the threshold value easily and the quality of transfer can be improved easily.

According to another method for increasing the aggregation effect, routes, of which the estimated values are either equal to, or closest to, "8" that is the threshold value, are picked as candidates. In the example shown in FIG. 17, Routes #2, #4 and #5 are picked as candidates. And by choosing one of these routes that has the largest number of flows (that is Route 5 in the example shown in FIG. 17), the route aggregating effect can be increased. According to this method, a significant route aggregating effect can be achieved easily.

FIG. 18 shows a specific example in which a memory and a route are selected based on an estimated value.

This drawing shows how each router manages a route leading from a bus master to a memory. Specifically, in the example illustrated in FIG. 18, the route information of Router (5) (i.e., transmission paths from Master #2 to respective memories) is shown. In the example shown in FIG. 18 (Master #2→Router (3)→Memory #1), a route leading from Master #2 to Memory #1 via Router (1) has been set. Estimated values have been calculated with respect to respective routes that have been set for Router (5). If a short delay transfer is required, the route "Master #2→Router (3)→Memory #1" with a low estimated value is selected.

These pieces of route information may be either put together dynamically by a method such as adaptive routing or defined in advance during the design process. If the adaptive routing based method is adopted, even an increase in load that has not been expected during the design process can also be coped with.

On the other hand, if the route leading from a bus master to a memory has been fixed during the design process as in the example shown in FIG. 18, then the implementation cost for routing and the power dissipated by the chip circuit can be cut down. By carrying out such a method that uses an estimated value, a memory and a route can be selected with the memory access load and the delay caused by the router both taken into account.

FIGS. 19A and 19B illustrate an example in which the circuits that form bus masters and routers are turned OFF on a functional block basis.

FIG. 19A shows exemplary transmission paths to take in a situation where the circuits of every bus master and every router have been turned ON. On the other hand, FIG. 19B shows exemplary transmission paths to take in a situation where the circuits of some bus masters and routers have been turned OFF. The latter situation is expected to encounter in a multi-function mobile phone in which the Web function and video processing function are implemented by an NoC. Specifically, when shooting processing is going to be performed using its built-in camera, a group of bus masters and a group of routers that perform the Web function are turned OFF but a group of bus masters and a group of routers that perform the video processing function are turned ON.

FIGS. 19A and 19B, the routers R that are directly connected to the bus masters on the uppermost row correspond to routers belonging to the group X of routers shown in FIG. 7, and the routers on the lowermost row correspond to routers belonging to the group Y of routers shown in FIG. 7. Even though no memories are shown in FIGS. 19A and 19B, some of the bus masters shown in FIGS. 19A and 19B may be replaced with memories.

In FIG. 19A, respective transmission paths have been selected so that respective traffic flows can run independently of each other. As a result, the transfer loads of the traffic flows are distributed.

On the other hand, in FIG. 19B, the transmission paths to use are combined and aggregated together so as to avoid routes that have been turned OFF. As a result, the power dissipation can be cut down with the number of routers to operate reduced. As to what routes have been turned OFF and are no longer available, it can be determined based on the information obtained by bus masters on an application level.

According to this embodiment, by aggregating traffic flows into a particular memory and a particular transmission path with the quality of transfer also taken into account, there can be a transmission path that no longer relays any traffic flow and the routers that do not relay any traffic flow can stop operating, As a result, power can be saved. On top of that, if the circuits of some bus masters and routers have been turned OFF due to a break of an application operation, for example, then data is transferred through limited transmission paths. As a result, this embodiment is also applicable to a situation where the traffic flows are aggregated together with the quality of transfer also taken into account. In addition, as for design tools, routers that have become redundant ones during the design process as a result of the aggregation can be removed during the implementation process. Consequently, a semiconductor device with a reduced implementation area is realized and bus masters can be easily added or modified. That is why this embodiment is also applicable to optimizing the design of a semiconductor device.

The present disclosure can be carried out not just as such on-chip (NoC) implementation but also as a simulation program for performing design and verification processes before that on-chip implementation process. And such a simulation program is executed by a computer. According to this embodiment, the respective elements shown in FIG. 5 are implemented as a class of objects on the simulation program.

By loading a predefined simulation scenario, each class gets the operations of the respective elements of the embodiments described above performed by the computer. In other words, the operations of the respective elements are carried out either in series or in parallel to/with each other as respective processing steps by the computer.

A class that is implemented as bus masters gets such a simulation scenario, which has been defined by simulator, loaded, thereby setting conditions on the timings to send packets virtually to a class of routers. Then, the transmission statuses of the'routes and the processing of this embodiment are simulated, thereby performing the operation of determining a memory and a transmission route.

The class that is implemented as bus masters performs its operation until the condition to end the simulation, which is described in the simulation scenario, is satisfied, thereby calculating and getting the throughput and latency during the operation, a variation in flow rate on the bus, and estimated operating frequency and power dissipation and providing them to the user of the program. And based on these data provided, the user of the program evaluates the topology and performance and performs design and verification processes.

For example, various kinds of information such as the ID of a bus master on the transmitting end, the ID of a bus master or a memory on the receiving end, the size of a packet or flit to send, and the timing to send the packet or flit is usually described on each row of the simulation scenario. Optionally, by evaluating a plurality of simulation scenarios in a batch, it can be determined efficiently whether or not the intended performance is ensured by every possible scenario imagined. Furthermore, by comparing the performance with the topology or the number of nodes of the bus and/or the arrangement of the processors, DSPs, memories and peripheral IOs changed, it can be determined what network architecture is best suited to the simulation scenario. In that case, the configuration of this embodiment can be used as design and verification tools for this embodiment. That is to say, the present disclosure can also be carried out as such design and verification tools.

A router (which is a power saved transfer device) according to the present disclosure can transfer data on a system LSI. This router can be used typically in a situation where a bus master such as a processor or an I/O is going to have access to a memory. However, the applications of the router of the present disclosure are not limited to such an access of the processor to a memory. Alternatively, the router may also be used in a situation where data is transferred between multiple processors and a DSP by replacing the memory with a multi-core processor or a graphics processor.

While the present disclosure has been described with respect to embodiments thereof, it will be apparent to those skilled in the art that the disclosed disclosure may be modified in numerous ways and may assume many embodiments other than those specifically described above. Accordingly, it is intended by the appended claims to cover all modifications of the disclosure that fall within the true spirit and scope of the disclosure.

What is claimed is:

1. A router for use in a data transfer system on a network on a chip that includes a first node from which data is transmitted, a plurality of second nodes at any of which the data that has been transmitted from the first node is receivable, and a plurality of routers that relay the data to be transferred between the first node and each of the second nodes, the router comprising:

a time delay processing circuit configured to obtain information about a load value of another router that is connected to a communications bus, the load value being a time delay caused by that another router; and an aggregation decision circuit configured to choose, in a situation where multiple traffic flows have been generated, one of the second nodes at which the data is to be received, and configured to determine a transmission path between the second node chosen and the first node in accordance with:

information about the load value obtained from each said router; and information determined during a design process about the number of stages of routers from the first node through each said second node.

2. The router of claim 1, further comprising:
a receiving section configured to receive data; and
a transmitting section configured to transmit information about the processing time delay;
wherein:
the time delay processing circuit obtains information about the processing time delay caused by another router that is connected to the communications bus; and,
if the router is connected to any of the plurality of memories, the time delay processing circuit forwards information about the processing time delay at the receiving section to another router by way of the transmitting section.

3. The router of claim 1, further comprising:
a receiving section configured to receive data of the traffic flow; and
an analyzing circuit configured to analyze the amplitude of the traffic flow based on that data,
wherein the aggregation decision circuit aggregates the transmission paths and the memories based on the amplitude of the traffic flow.

4. The router of claim 1, further comprising a flow crossing decision circuit configured to determine, based on the destinations of the plurality of traffic flows, whether or not there is any crossing between the traffic flows, and if there is any crossing, configured to change the destination of at least one of the traffic flows, thereby minimizing crossing.

5. The router of claim 1, wherein the aggregation decision circuit aggregates the transmission paths and the memories if the traffic flows have been generated continuously but removes the transmission paths and the memories from the target of aggregation if the traffic flows have been generated intermittently.

6. The router of claim 1, wherein the second nodes are memories, and
wherein the aggregation decision circuit chooses one of the second nodes at which the data is to be received using information about memory speed determined during a design process, and information about information determined during a design process about the number of stages of routers from the first node through each said second node.

7. A chip circuit comprising:
at least one bus master;
a plurality of memories; and
the routers of claim 1 which are arranged on a communication bus that forms a network between the at least one bus master and the plurality of memories.

8. The chip circuit of claim 7, wherein the aggregation decision circuit provided for at least one of the routers aggregates the transmission paths to transfer those traffic flows through and memories to store data on those traffic flows, and stops operating the routers that no longer transfer any traffic flow as a result of the aggregation.

9. The chip circuit of claim 7, wherein the aggregation decision circuit provided for at least one of the routers aggregates the transmission paths to transfer those traffic flows through and memories to store data on those traffic flows, and stops operating the memories that no longer store data on any traffic flow as a result of the aggregation.

10. The chip circuit of claim 8, wherein the aggregation decision circuit provided for at least one of the routers aggregates the transmission paths to transfer those traffic flows through and memories to store data on those traffic flows, and stops operating the memories that no longer store data on any traffic flow as a result of the aggregation.

* * * * *